(12) United States Patent
Hamer

(10) Patent No.: US 11,100,953 B2
(45) Date of Patent: Aug. 24, 2021

(54) AUTOMATIC SELECTION OF AUDIO AND VIDEO SEGMENTS TO GENERATE AN AUDIO AND VIDEO CLIP

(71) Applicant: CrowdFlik, Inc., Westport, CT (US)

(72) Inventor: Christopher Hamer, Westport, CT (US)

(73) Assignee: CROWDFLIK, INC., Westport, CT (US)

(*) Notice: Subject to any disclaimer, the term of this patent is extended or adjusted under 35 U.S.C. 154(b) by 0 days.

(21) Appl. No.: 16/429,756

(22) Filed: Jun. 3, 2019

(65) Prior Publication Data
US 2019/0287569 A1 Sep. 19, 2019

Related U.S. Application Data

(63) Continuation of application No. 14/844,471, filed on Sep. 3, 2015, now Pat. No. 10,347,288, which is a
(Continued)

(51) Int. Cl.
| | |
|---|---|
| *G11B 27/031* | (2006.01) |
| *H04N 21/2743* | (2011.01) |
| *H04N 21/218* | (2011.01) |
| *H04N 21/414* | (2011.01) |
| *H04N 21/472* | (2011.01) |
| *H04N 21/658* | (2011.01) |
| *H04N 21/845* | (2011.01) |
| *H04N 21/854* | (2011.01) |
| *G11B 27/034* | (2006.01) |
| *G11B 27/11* | (2006.01) |

(Continued)

(52) U.S. Cl.
CPC .......... *G11B 27/031* (2013.01); *G11B 27/034* (2013.01); *G11B 27/10* (2013.01); *G11B 27/11* (2013.01); *G11B 27/32* (2013.01); *G11B 27/322* (2013.01); *H04N 21/21805* (2013.01); *H04N 21/2743* (2013.01); *H04N 21/41407* (2013.01); *H04N 21/47205* (2013.01); *H04N 21/6582* (2013.01); *H04N 21/8456* (2013.01); *H04N 21/854* (2013.01); *H04N 21/8545* (2013.01); *H04N 21/4751* (2013.01)

(58) Field of Classification Search
CPC ..... G11B 27/031; G11B 27/034; G11B 27/10; G11B 27/11; G11B 27/32; G11B 27/322; H04N 21/21805; H04N 21/2743; H04N 21/41407; H04N 21/47205; H04N 21/6582; H04N 21/8456; H04N 21/854; H04N 21/8545
See application file for complete search history.

(56) References Cited

U.S. PATENT DOCUMENTS

| | | | | |
|---|---|---|---|---|
| 2009/0087161 | A1* | 4/2009 | Roberts | G11B 27/10 386/282 |
| 2009/0265737 | A1* | 10/2009 | Issa | G06Q 10/10 725/38 |

* cited by examiner

*Primary Examiner* — Mishawn N. Hunter
(74) *Attorney, Agent, or Firm* — DLA Piper LLP (US)

(57) ABSTRACT

Systems and methods are disclosed for automatically generating an audio and video clip comprising a plurality of audio and video segments. In one embodiment, an audio and video clip comprising a first audio and video segment and a second audio and video segment is generated, where the first audio and video segment was automatically selected from a first plurality of audio and video segments and the second audio and video segment was automatically selected from a second plurality of audio and video segments.

16 Claims, 23 Drawing Sheets

Related U.S. Application Data continuation of application No. 14/103,541, filed on Dec. 11, 2013, now Pat. No. 9,129,640.

(60) Provisional application No. 61/790,066, filed on Mar. 15, 2013, provisional application No. 61/760,129, filed on Feb. 3, 2013, provisional application No. 61/736,367, filed on Dec. 12, 2012.

(51) Int. Cl.
*G11B 27/10* (2006.01)
*G11B 27/32* (2006.01)
*H04N 21/8545* (2011.01)
*H04N 21/475* (2011.01)

800

805 — A plurality of users each create a video and audio clip using Review/Edit Platform 500 or 600

810 — Each video and audio segment selected by a user receives a "vote," and a running tally is stored for each segment 815 — The server 30 indicates to a user which video segment and audio segment for each time segment of Y duration in an event received the most votes 820 — The server 30 automatically generates a crowd curated video and audio clip containing the video and audio segments that received the most votes for each time segment of Y duration in an event 825 — A user can then view and listen to the crowd curated video and audio clip

Segment ID
Event Name
Time
Location (Latitude/Longitude)
Tags
Name of Creator
Number of times selected
Number of times viewed
Other metadata

FIGURE 16

AUTOMATIC SELECTION OF AUDIO AND VIDEO SEGMENTS TO GENERATE AN AUDIO AND VIDEO CLIP

CROSS-REFERENCE TO RELATED APPLICATIONS

This application is a continuation of U.S. patent application Ser. No. 14/844,471, filed on Sep. 3, 2015, and titled "Method and System for Capturing, Synchronizing, and Editing Video From a Primary Device and Devices in Proximity to the Primary Device," which is a continuation of U.S. patent application Ser. No. 14/103,541, filed on Dec. 11, 2013, and titled "Collaborative Digital Video Platform That Enables Synchronized Capture, Curation and Editing of Multiple User-Generated Videos," issued as U.S. Pat. No. 9,129,640 on Sep. 8, 2015, which claims priority from U.S. Patent Application Nos. 61/736,367 filed on Dec. 12, 2012, 61/760,129 filed on Feb. 3, 2013, and 61/790,066 filed on Mar. 15, 2013, each of which is incorporated herein by reference.

FIELD OF THE DISCLOSURE

The present disclosure relates generally to video capture, editing and creation, and more specifically, to systems, methods and computer-accessible mediums for creating a video using a plurality of segments captured by different devices, enabling the synchronized review and editing of video from multiple capture devices from multiple locations.

BACKGROUND

With the global proliferation of video enabled mobile devices, consumers capture and upload millions of videos each week. Often, numerous videos of events are posted, sometimes numbering in the hundreds for popular events such as concerts, sporting events and other public occasions. These amateur videos often are of uneven quality and length, and with a large number of websites in which to post a video, it is hard for consumers to know where to find a video of an interest of a certain topic or location.

In addition, in the prior art the labeling or tagging of a submitted video is left to the submitter and is not subject to any standards for grouping or searching. The ability to sort through this mass of video content is nearly impossible.

There is also no method to easily combine multiple videos that are captured of a particular event. Further, there is no simple way to edit those multiple videos into a single video or into a video of multiple best-of edits. Traditional film edit tools are expensive and hard to use. Further, the output is typically a single edited version based on the editor's determination of best edit. There is no consumer friendly way to create individual edits of a video, or to create and/or view an edit of a film that is a result of the wisdom of the crowd throughout the video. Other websites have created "black box" scene selectors to combine videos, but this typically results in videos of limited value, and fails to engage the crowd in the creation and edit process.

There is also no method available to consumers to enable the sharing and collaboration on video in a "private" environment that allows a limited subset of users (such as users who have been invited by an originator) to access videos and contribute videos. There is also no simple way for each individual to make his own video version or edit of an event that has been filmed by multiple cameras or smart phones during the event. There also is no method for synchronized capture and review of multiple angles from multiple locations to use for security review and entertainment. The wisdom of the "crowd" and the needs of the individual have been largely ignored in the various attempts to combine multiple amateur video submissions.

BRIEF SUMMARY OF THE INVENTION

The embodiments described herein utilize an application ("app") known as "CROWDFLIK." CROWDFLIK is preferably implemented as an app for mobile devices, such as smartphones and tablets. It also can be implemented as an app for desktops, notebooks, or any other device that can capture video and run a software application. The app works in conjunction with a server, accessible over the Internet, which together facilitate the synchronized capture, synchronized grouping, multiple user edit, crowd curation, group and individual viewing, multiple edits and sharing of video edits and clips.

The CROWDFLIK app allows each user to activate and/or accept a location/event confirmation, or check-in, in order to activate the capture and submit video function of the CROWDFLIK app which tags or marks each submitted video with location specific data, allowing proper grouping for synchronized review and edit. During the video capture and submission process, the CROWDFLIK mobile app activates a unique process of synchronized tagging, or cutting, of the video at synchronized Y second increments according to the CROWDFLIK app's master clock, where Y is the length, typically measured in seconds, of each subsegment of submitted video. The captured videos are cut at synchronized Y second intervals. Typically, only full Y second segments are submitted to the CROWDFLIK app's Review/Edit platform. The segments are then grouped and synchronized on the CROWDFLIK Review/Edit platform for user combination, editing, review, sharing, tagging, re-editing, saving, and more based on the location/time tag.

The CROWDFLIK Review/Edit platform allows users to review all video submissions that have been combined and synchronized for each location/time (e.g., event). The CROWDFLIK app Review/Edit platform allows users to review and edit the multiple submissions to create unique video edits of the event. The CROWDFLIK app allows for a seamless resynchronization of the series of segments selected by the user resulting in his or her own personal edit. A user is permitted to select a subset of the entire event video in order to create and save shorter videos that are a subset of the overall video based on selecting submission for each successive time segment of Y second(s). The aggregate of the individual selections determines a 'best of' selection for each Y second(s) segment which in turn determines the crowd curated best-of edit based on the CROWDFLIK curation algorithm.

One benefit of these embodiments is that a user can generate a video of an event using segments that were captured from different devices at the event. Unless an event is designated as private or is otherwise restricted, any user with access to the CROWDFLIK app may review, create edits, share, and upload filks regardless of whether they attended the original event.

BRIEF DESCRIPTION OF THE DRAWINGS

FIG. 14 depicts an embodiment for generating crowd curated video and audio clips.

FIG. 16 depicts an exemplary data structure for a video or audio segment.

DETAILED DESCRIPTION OF PREFERRED EMBODIMENTS

In a preferred embodiment, CROWDFLIK is a mobile app for use on mobile devices, such as smartphones, tablets, and the like, that works in conjunction with an Internet platform that facilitates uploading, downloading, and encoding for a variety of device platform playback, as well as coding for a variety of security and privacy preferences. The mobile app and Internet platform also facilitate the synchronized capture, synchronized grouping, distributed reviewing, crowd curation, group and individual viewing, multiple edits and sharing of edited video clips.

Figure 1A:
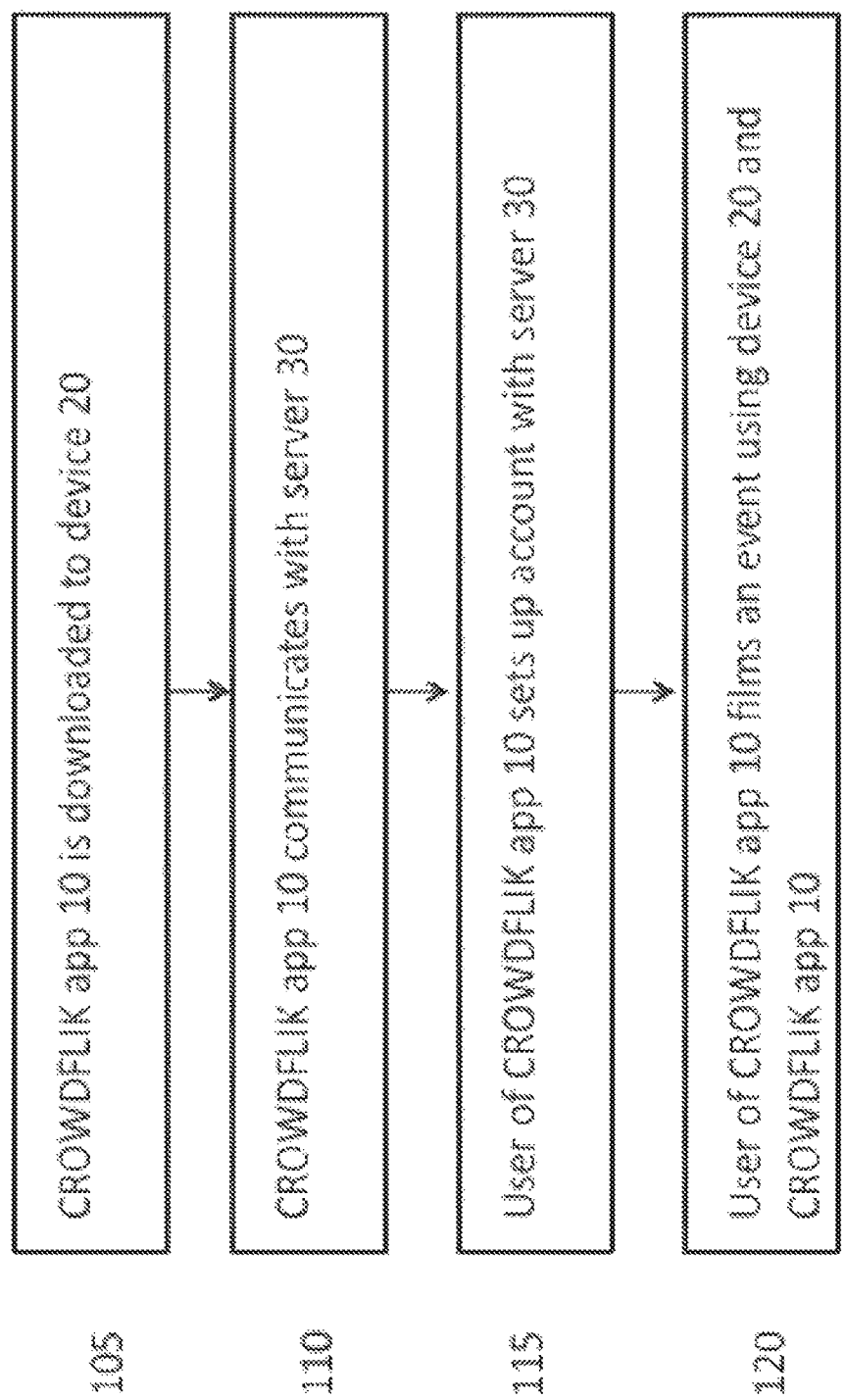
FIG. 1A is a flow chart illustrating a typical CROWDFLIK account set up and log-in process.

FIG. 1A is a flow chart illustrating a typical CROWDFLIK account set up and log-in process. Preferably, the CROWDFLIK app 10 is downloaded to a user's device 20 at step 105, and the app 10 thereafter resides on device 20.

At step 110, app 10 establishes communication with server 30. Private and secure Internet connections are supported. Connectivity with server 30 can be activated or deactivated on device 10 in order to save the battery life of device 10. The connectivity can be accomplished using any known networking technology, including local area and wide area networks, Wi-Fi, Wi-MAX, COMS, 3G 4G, LTE and the like.

In order to use the CROWDFLIK app 10 video capture function, the user will set up an account with server 30 (FIG. 1A, step 115), such as by creating a unique User ID and password, and entering basic identifying information such as an email address. The app 10 permits users to create and maintain multiple accounts by connecting their CROWDFLIK accounts with their accounts at other popular social media sites such as Facebook, Twitter, Google+. The app 10 also allows users to combine their multiple accounts into a single account. Once the user has created an account, and logged into the CROWDFLIK app 10 and/or server 30, the user can begin filming an event at step 120. When the CROWDFLIK app 10 is activated, it preferably opens and operates along with the native video camera function of device 20.

Figure 1B:
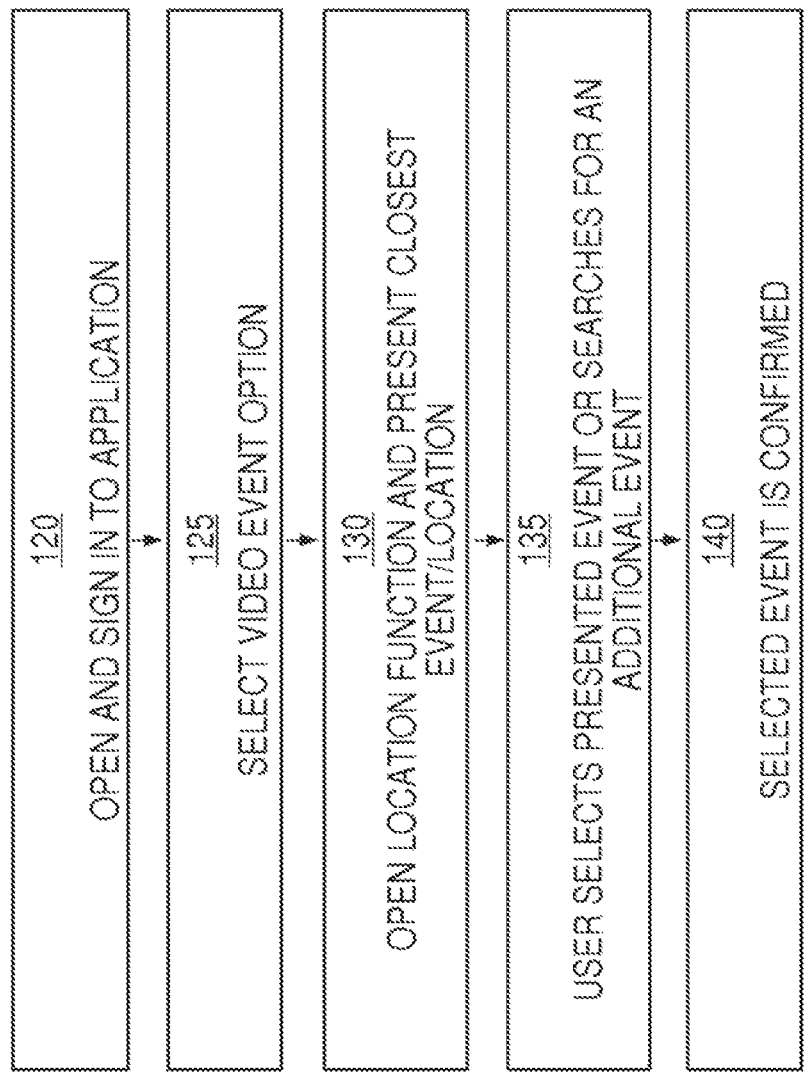
FIG. 1B is a flow chart illustrating a typical event setup.

FIG. 1B is a flow chart illustrating a typical event setup. When a user wants to use the video capture function of app 10, the user opens or activates the CROWDFLIK mobile app 10, and signs in to his account within the app 10 at step 120. The user then selects the option to capture an event at step 125. This begins the check-in process. The app 10 utilizes the native video function of device 20. The CROWDFLIK app 10 can gather location information from device 20 to assure proper placement of the submitted video at the Review/Edit platform of CROWDFLIK. This is achieved using a combination of the global positioning system ("GPS") or other location function of device 20, other social media applications where permitted, and custom application functionality for devices that can utilize such custom modules.

Figure 9:
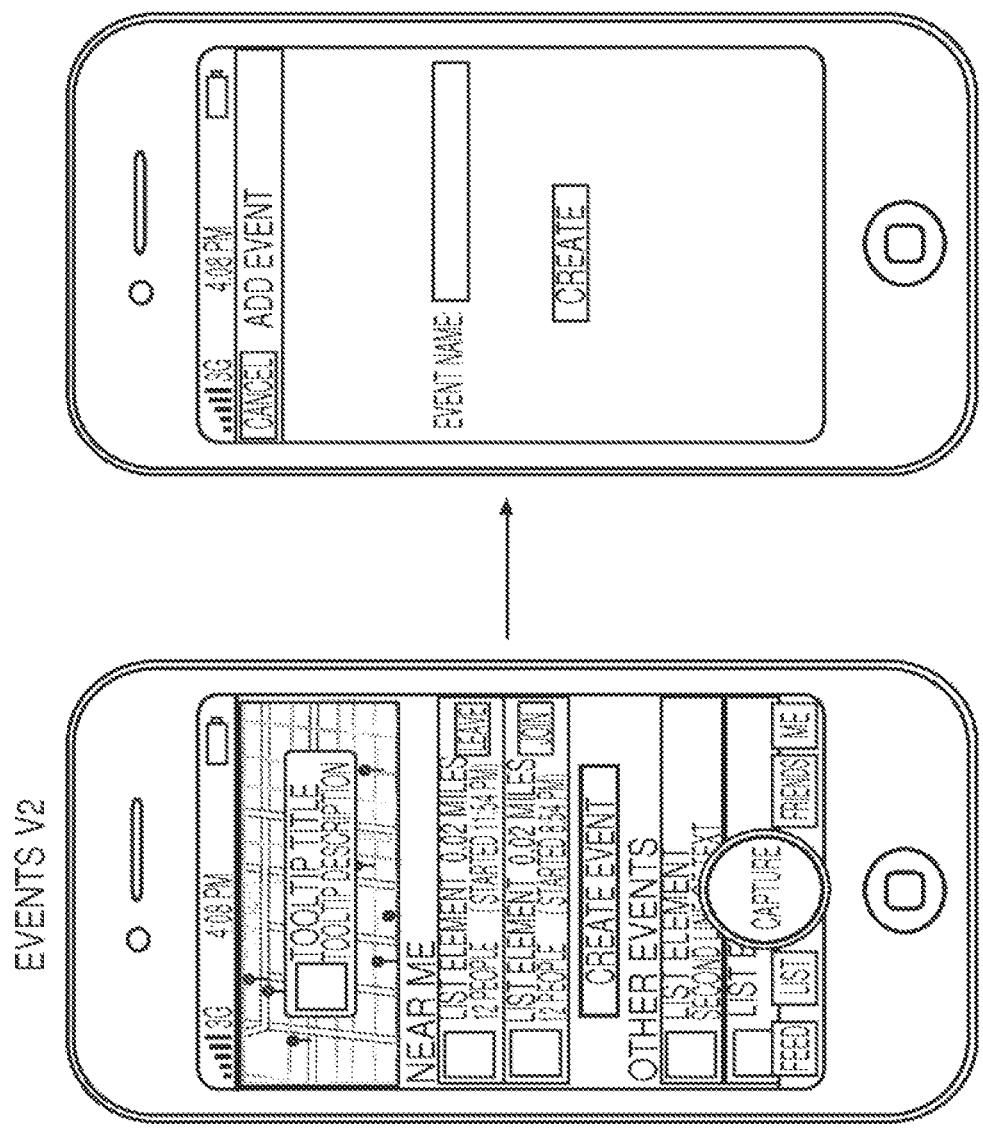
FIGS. 9A and 9B illustrate the screen flow enabling users to join an event or create an event in which to use the app to capture video.
Figure 13:
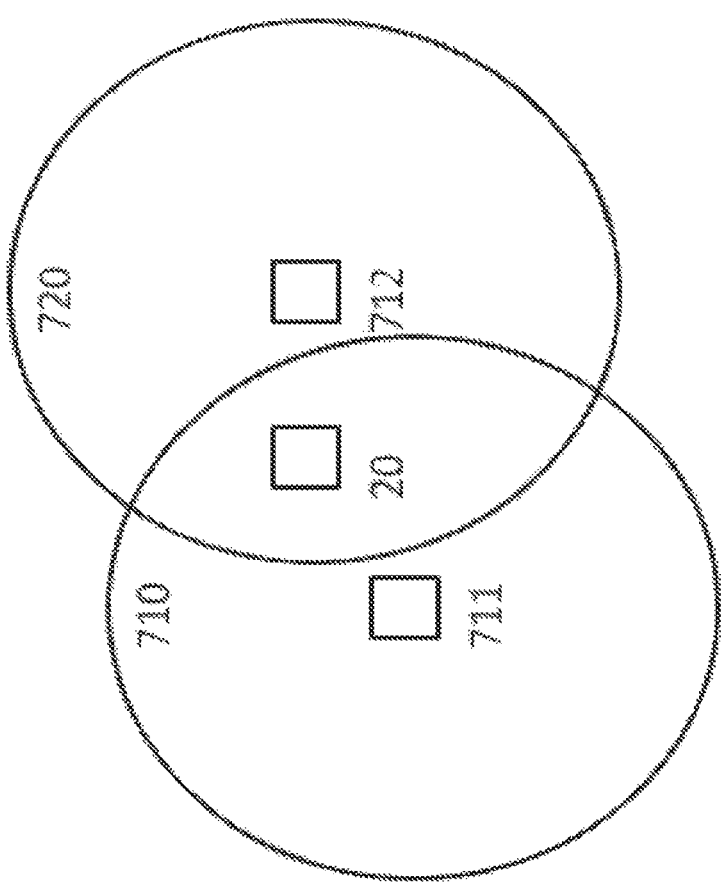
FIG. 13 depicts an embodiment involving geofencing.

As illustrated in step 130, and in FIGS. 9A and 9B and 13, during the check-in process, the user is presented with a list of CROWDFLIK events that are within a predetermined geofence in which the user is located, and have already been initiated by other users. As illustrated in FIGS. 9A and 9B, the available events can by depicted graphically, such as on a map, or in list form showing events that are close to the user or events that may be of interest to the user. Events that a user may join optionally can be identified by determining within which event geofences the user is located. With reference to FIG. 13, device 711 has created an event. The creation of the event includes the establishment of geofence 710, which in this example is a circle of radius R from the location of device 711. Here, another geofence 720 is established around device 712 after device 712 establishes another event. R can be set to any value, such as 50 feet or 500 feet depending on the type of event in question (e.g., a school music concert v. a rock concert). If device 20 wishes to join an event, server 30 will notify it about the events created by devices 711 and 712 because device 20 in this example is within geofence 710 and geofence 720.

With reference again to FIG. 1B, at step 135, if the event that the user wants to capture using the CROWDFLIK app 10 is listed, then the user can select the pre-identified event; if the event is not listed, then the user can search for an additional event or add (e.g., create) a new event by accepting the location and giving the event a name. This is shown, for example, in FIG. 9B which illustrates an exemplary screen display after a user selects the Create Event button in FIG. 9A. When a user creates an event, he/she is the event creator and may select event attributes such as privacy status and event end time and may edit these attributes at future times. Other users who are at the same event may subsequently join the newly created event. After a previous event has been selected, or a new event has been created, the selected event is confirmed at step 140.

Figure 1C:
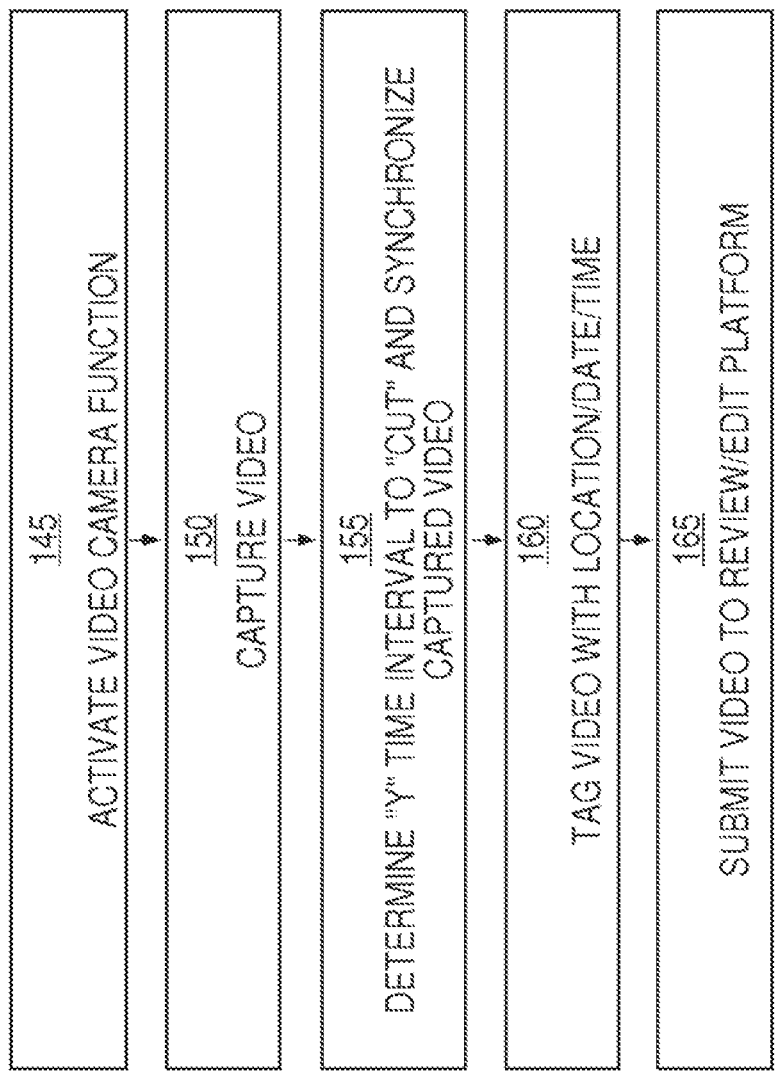
FIG. 1C is a flow chart illustrating a typical video capture and submission.
Figure 7:
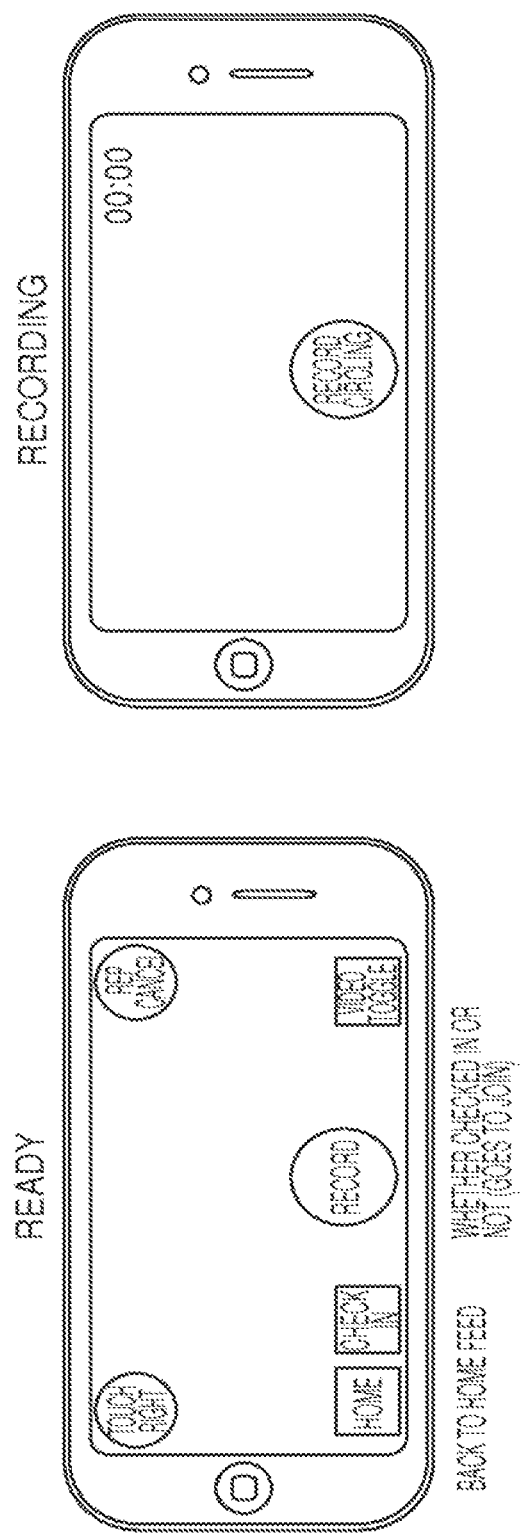
FIG. 7 details the screen flow of the capture function in the capture state and the ready state.

Once the event has been confirmed, the user can begin filming or recording the event (e.g., FIG. 1C and FIG. 7). For example, the user can select begin capture on the CROWDFLIK app 10, and the CROWDFLIK app 10 can activate the device 20's video camera function at step 145. Once the CROWDFLIK app 10 is activated for video capture, it initiates a location check-in function using a combination of the device's native location determination functionality and wireless access and other tri-angulation methods available including, but not limited to Wi-Fi, WiMAX, most recent position, cellular signal, global positioning system ("GPS") signal, blue tooth, near field communications, sonic tone, quick response ("QR") code and/or Bar code to give the user the ability to initiate a check-in process used for submitting video to the CROWDFLIK review/edit platform.

Figure 3:
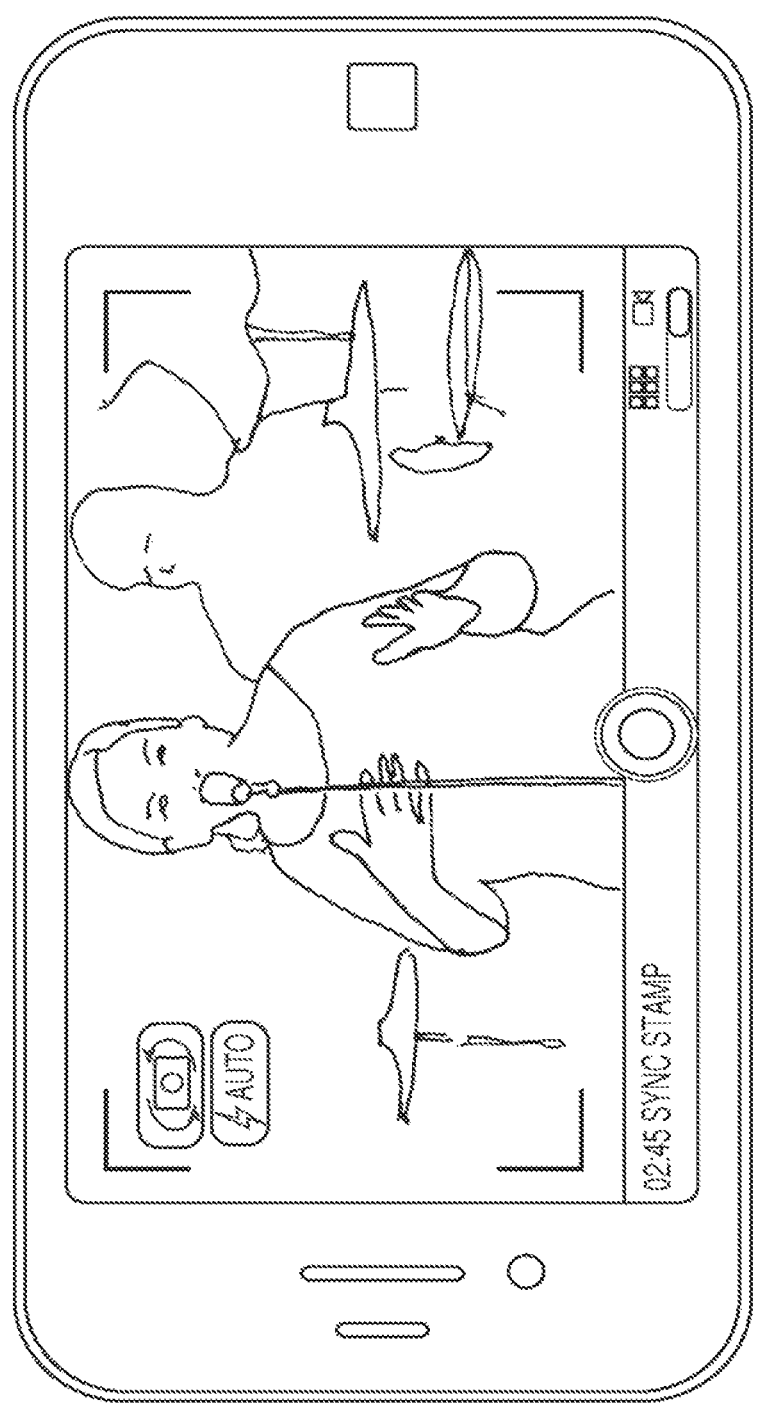
FIG. 3 is a pictorial diagram illustrating an exemplary screen shot of the CROWDFLIK video capture process on a typical smart device having a video capture function.

At step 150, the CROWDFLIK app 10 can begin capturing the video (see also FIG. 3). At random or predetermined time intervals during capture, in the background, the CROWDFLIK app 10 can check to confirm that the current location of the device is consistent with the previously submitted and tagged location. In the case of a discrepancy, as determined for example using an algorithm based on a combination of geo-fencing data based on the initial location of the device that created the event and location data of device 10, the user will receive a notification (e.g., a pop up window-type notification) asking the user to reconfirm the location. The subsequent video will be tagged with the revised location data, if necessary.

In another embodiment, an event is created based on the participants involved rather than on location information, which allows the selected or invited devices to be synchronized over a period of time regardless of location. In another embodiment, a first user may create a personal event where his or her device is the center of the event. As the first user moves, other users in proximity of the first user may join the event, thereby capturing and contributing synchronized video to the first user's event. This can be useful, for example, if the user is sightseeing or engaged in other physical movement.

In another embodiment, a first user may create a personal event where his or her device is the center of the event. As the first user moves, video/audio captured by other users within a certain geofence of the first user automatically are added to the event, thereby capturing and contributing synchronized video to the first user's event. This can be useful, for example, if the user is sightseeing or engaged in other physical movement. For example, if a user runs a marathon and films a portion of the marathon, the user will later have access to video/audio captured by other users who were within the geofence of that user as he or she moved. The user can then create a video/audio clip (flik) that contains video/audio from other users whom the user does not even know or interact with.

The CROWDFLIK app 10 preferably synchronizes all devices at any given event that are using the CROWDFLIK 10 app to capture video, and that have selected the specific event.

However, in case multiple instances of the event are separately created by multiple users, the CROWDFLIK app 10 and server 30 can synchronize these multiple instances at a later time.

In one embodiment, the CROWDFLIK app 10 can incorporate a clock algorithm that uses the Internet or other network functionality to connect with a known, reliable clock 40 such as the US Naval Atomic clock to determine the difference between the Atomic time and the time code of each individual device. The Naval Atomic clock can then serve as the CROWDFLIK master clock, and all time stamping and coding can be referenced to this master clock. The CROWDFLIK app 10 can then apply a "time-delta" to each device based on the difference between the clock of device 20 and the master clock. Preferably, the "time-delta" can be applied as Meta tags to each video segment captured and uploaded by the CROWDFLIK app 10 for future review, edit and sharing.

Alternatively, in a peer-to-peer time embodiment, the device of the creator or another user can serve as the master clock, and all other devices who join the same event will synchronize to that clock. Thereafter, each device that has synchronized to the master clock can serve as additional master clocks for new devices that join the event.

In another embodiment, instead of time synchronization, video streams can be synchronized based on sound or images. For example, if two different devices capture video streams of an event, even if they are not synchronized to a master clock or to each other, the captured video can still be synchronized based on image recognition performed on the video streams or based on sound detection performed on the audio streams associated with the video streams. This would be particularly accurate, for example, for synchronizing multiple captures of a speech, rock concert, sporting event, etc.

When video is captured, the CROWDFLIK app 10 determines time intervals of duration "Y" to cut and synchronize the captured video at step 155. Y can be, for example, 5 seconds, 10 seconds, or any desired duration. Each Y second(s) segment of the video is tagged and/or marked at step 160 with the location data determined from the check-in, and the time data as determined by the app's master clock. The captured video can be submitted to server 30 at step 165, and all video submissions can be tagged and/or marked with time/date/location for synchronized display and edit at the proper section of the Review/Edit platform in order for videos to be placed in a synchronized fashion with other videos from like events. In certain embodiments, the app may allow users to select different values for "Y" to review and edit video. Users may select shorter or longer lengths of the segments depending on the user's needs at the time they are creating fliks. Users may also select varied time segments for their creative purposes.

The CROWDFLIK app time tagging at pre-selected, uniform intervals of Y seconds is utilized to assure the seamless re-synchronization of users' preferred video segment for each time slot.

A video captured via the CROWDFLIK app is "cut" or marked at Y second intervals. Typically, the length of time that represents Y for each segment is predetermined by the app, and is applied on a consistent basis to all video segments captured and uploaded via the CROWDFLIK app at a given event. Preferably, only full Y second(s) segments are submitted. For example, if a user begins to capture video in between the Y second(s) segments, the first video segment prior to the start of the next Y second(s) segment may be incomplete, and may not be submitted to the Review/Edit platform depending on rules that the CROWDFLIK app is applying at that time to the video captured at that event. Alternatively, the incomplete segment may be padded at the beginning of the segment with blank video content to extend the segment to a full Y second clip. A similar process may take place when the video capture ends after Y second(s) but before a subsequent Y second(s) where only the full Y second(s) segments may be uploaded to the platform. In one embodiment, all of the user's video is uploaded to the server, and only segments that are Y seconds (i.e., full clips) are presented during the review and edit process. In another embodiment, the user can decide whether segments that are less than Y seconds in duration should be uploaded to the server.

The video captured by the device 20 running CROWDFLIK 10 is saved on the device 20 in its entirety in the conventional manner that is determined by the device. In other words, as the video is processed and submitted by the CROWDFLIK app 10, it is simultaneously saved on device 20 in an unprocessed and uncut form according to the host device standards. The various video segments captured via the CROWDFLIK app 10 from the various users are then grouped and synchronized according to location/time/event tags on the CROWDFLIK Review/Edit platform for subsequent multiple user edit, review, sharing and saving. In the alternative, CROWDFLIK app 10 permits the user to opt out of saving all video to device 20 in the settings function if the user wants to upload only to CROWFLIK app 10 and server 30.

A user can capture video of any length via the CROWDFLIK app 10 for submission to the CROWDFLIK Review/Edit platform. The CROWDFLIK app 10's unique location/time tagging functionality at the time of video capture allows for proper grouping and synchronization, and gives the user robust search functionality.

The CROWDFLIK app 10 allows multiple simultaneous videos from multiple devices to be captured and uploaded via the CROWDFLIK app 10 to be viewed and edited, and can be grouped according to the location/time tagging.

Figure 1D:
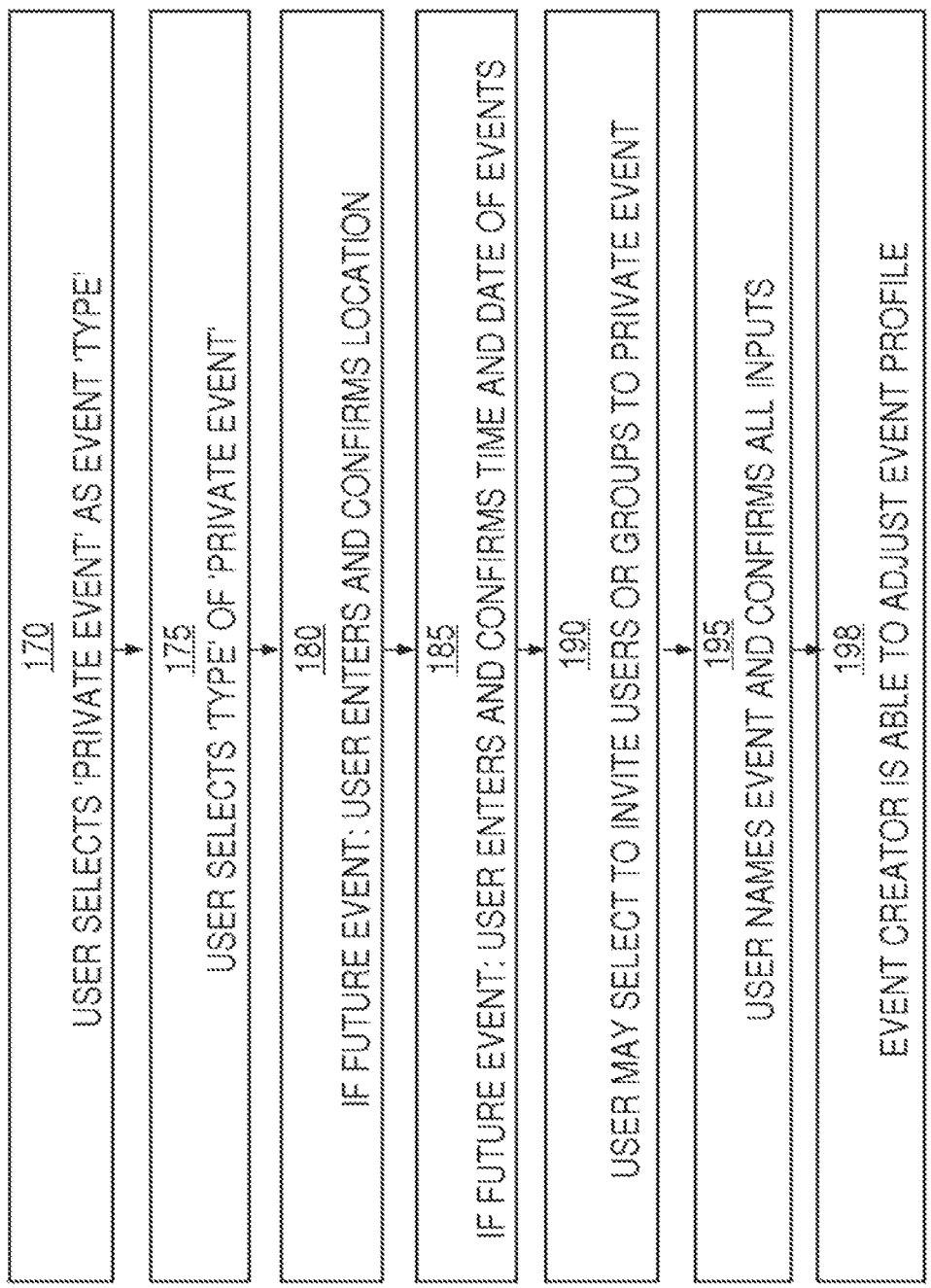
FIG. 1D is a flow chart illustrating a typical setup of a private event.

With reference to FIG. 1D, a method of establishing a private event is depicted. The user selects "private event" as the event type using device 20 (step 170). The user selects the type of private event (step 175). If the type is a future event, the user enters and confirms the location of the private event (step 180). If the type is a future event, the user confirms the creation of the event (step 185). The user optionally selects users or groups to invite to the private event (step 190). Optionally, the user can establish a password to enable users to join the private event. The user names the event and confirms all inputs (step 195). Thereafter, the event creator is able to adjust the event profile (step 198). The name of the event can be significant. For example, if an advertiser or sponsor can set up a future event and put its name in the name of the event, such as "Company X Presents Rock Concert Y." Thereafter, all actions associated with that event, such as the actions described herein, will trigger the use or display of that name, and Company X will obtain a brand promotion and advertising benefit from the usage, long after the event itself is over.

Figure 4:
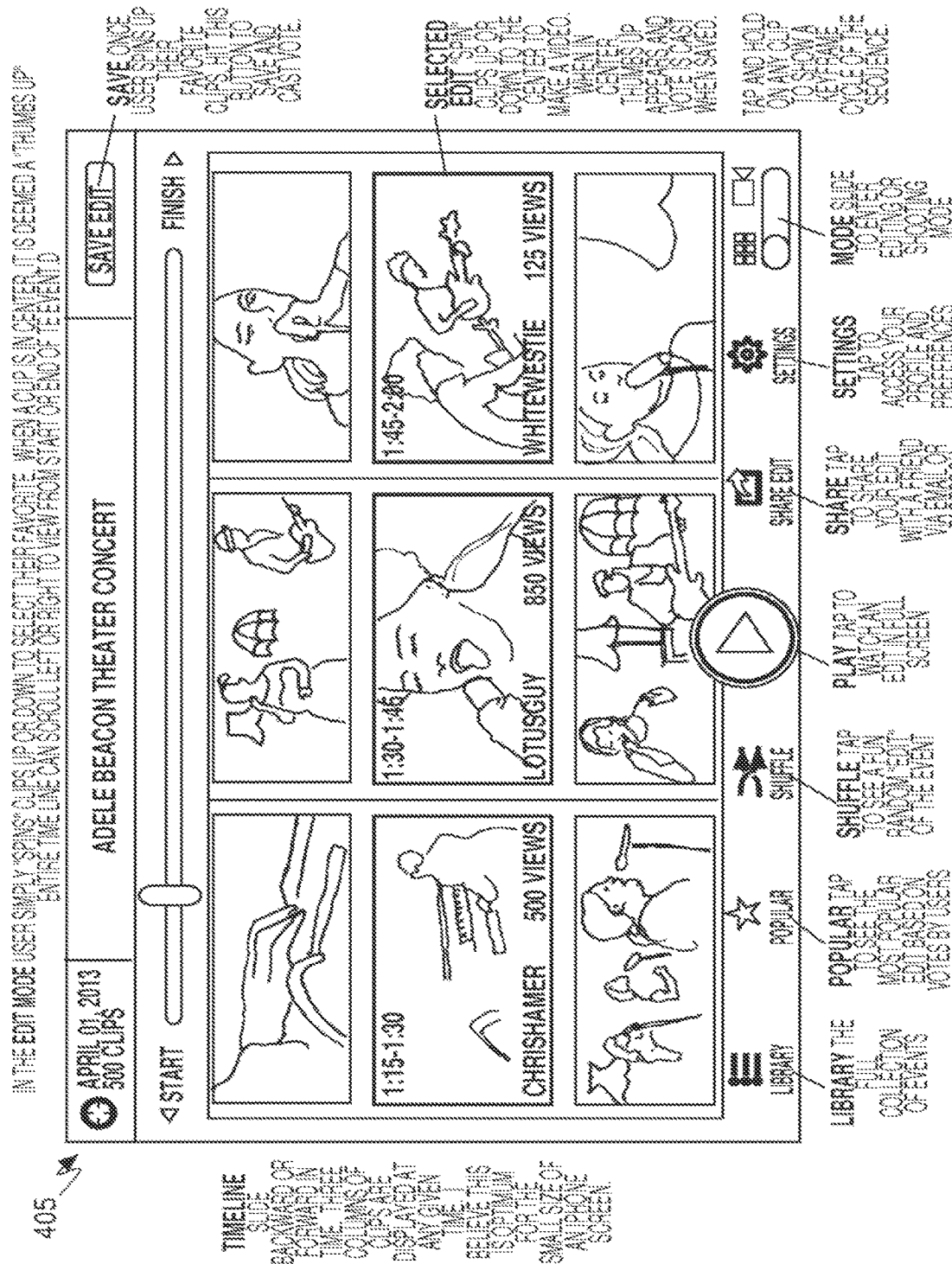
FIG. 4 is an exemplary screen shot of a Review/Edit screen of the present systems, methods, and computer-accessible mediums with annotations.

The Review/Edit platform 500, which is illustrated in FIGS. 4 and 5, is accessible via the CROWDFLIK app 10 as well as a website provided by server 30. For example, the Review/Edit platform 500 can be displayed on device 20 or on any computer or device with Internet access.

Figure 5A:
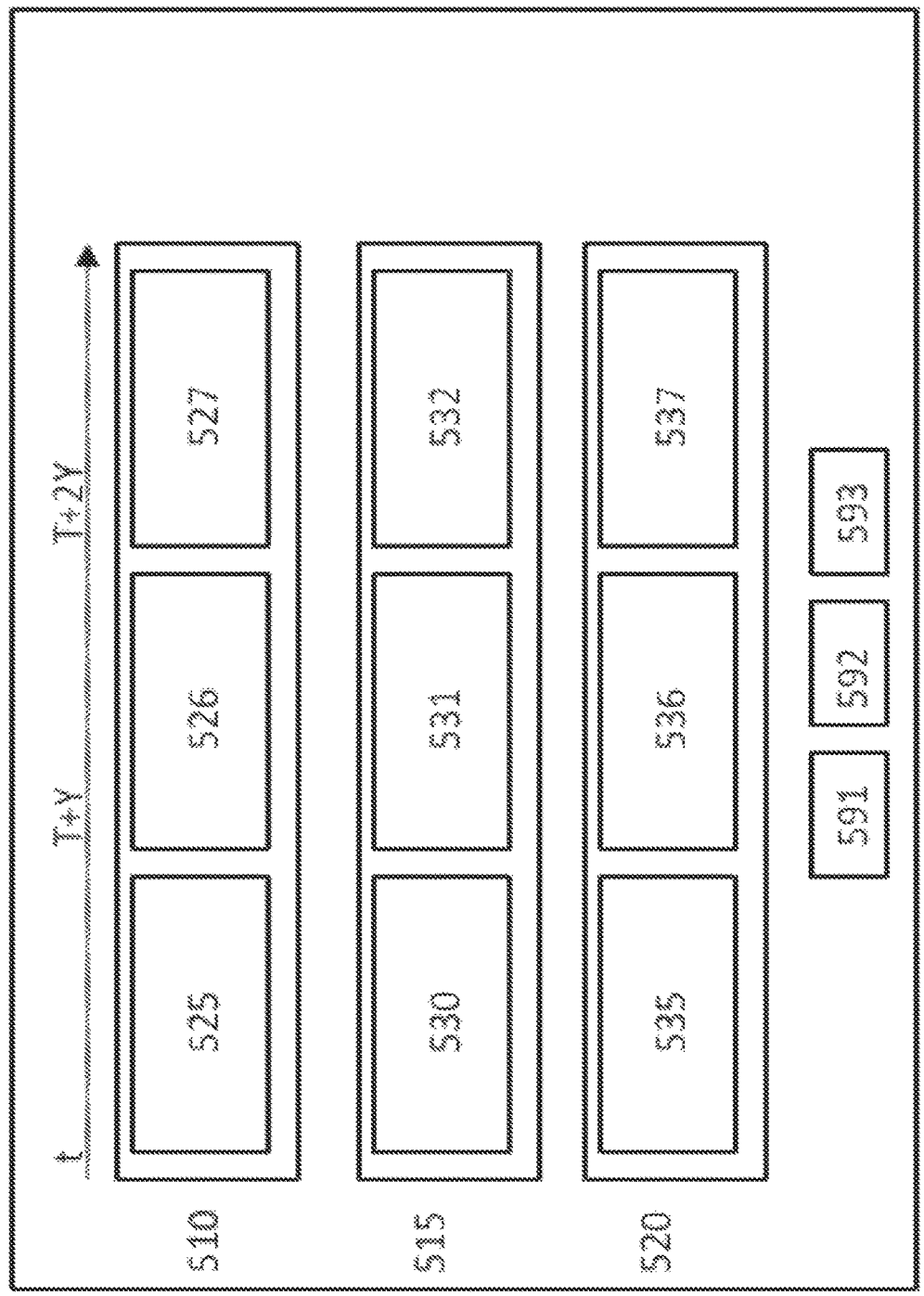
FIG. 5A illustrates the review/edit functionality where users are enabled to select a video segment and drag to a timeline.

Referring to FIG. 5A, the Review/Edit platform 500 provides a graphical user interface ("GUI") that may include a segmented timeline 510 which will accept and display the user selected segments to create the user edit. The Review/Edit platform 500 can also provide windows to illustrate the available segmented video streams for an event, such as video streams 515, and 520. Timeline 510 is partitioned into Y long segments 525, 526, and 527. Each segment begins at a certain time based on the master clock. In this example, the first segment begins at time t, and second segment at time t+Y, the third segment at time t+2Y, etc Similarly, video stream 515 is partitioned into Y long segments 530, 531, and 532, with segment 530 beginning at time t, segment 531 beginning at time t+Y, and segment 532 beginning at time t+2Y. Video stream 520 is partitioned into Y long segments 535, 536, and 537, with segment 535 beginning at time t, segment 536 beginning at time t+Y, and segment 537 beginning at time t+2Y For example, if Y is 60 seconds and t is 5:00 p.m., segments 525, 530, and 535 would begin at 5:00 p.m., segments 526, 531, and 536 would begin at 5:01 pm, and segments 527, 532, and 537 would begin at 5:02 pm, etc. For illustration purposes, only three segments are shown for timeline 510 and video streams 515 and 520, but one of ordinary skill in the art will appreciate that segments of any number can be used.

A user can roll vertically through the available segments within each time slot of Y duration, and can select and place segments from any available video 515, and 520 and all additional video uploaded to the platform timeline 510, to create a user customized video of the event. Each segment selected from video 515, 520, or other video can only be placed in the timeline 510 at the location corresponding to the location on the timeline. For example, if segment 526 begins at 5:01 pm, only segments from video 515, 520, or other video that also begin at 5:01 pm can be placed in segment 526, in this example, segments 531 and 536. This ensures temporal synchronization from all video streams.

Review/Edit Platform 500 optionally can include input devices 591, 592, 593, and others to perform certain functions. For example, input device 591, when selected, can generate a screen shot capture of a shot within a video 510, 515, or 520 and allow the user to then download (for example, as a JPEG file) or view a still image of that shot. This allows an easy way for a user to obtain a photo from a video.

Figure 5B:
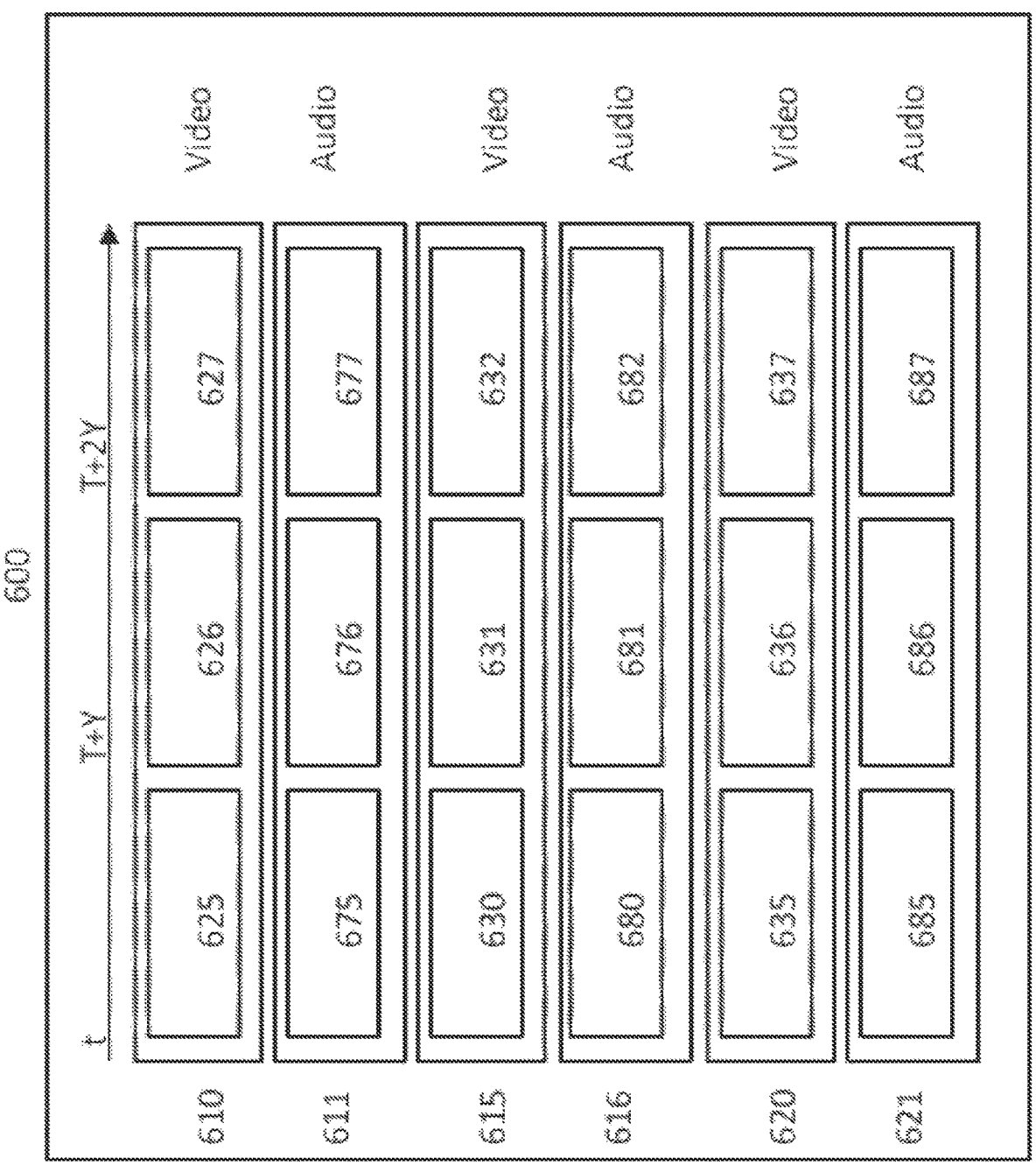
FIG. 5B illustrates the review/edit functionality where users are enabled to select a video segment and an audio segment and drag to a timeline

A variation of the embodiment of FIG. 5A is shown in FIG. 5B. In FIG. 5B, Review/Edit platform 600 provides a GUI that may include a segmented video timeline 610 which will accept and display the user selected video segments to create the user video edit. However, FIG. 5B also provides segmented audio timeline 611 which will accept and play the user selected audio segments to create the user audio edit. The Review/Edit platform 600 can also provide windows to illustrate the available segmented video streams for an event, such as video streams 615 and 620, as well as the available segmented audio streams for an event, such as audio streams 616 and 621. Timelines 610 and 611 are partitioned into Y long segments 625, 626, 627 and 675, 676, 677, respectively. It will be understood that many other video and audio streams can be present, and timelines 610 and 611 can extend well beyond three segments. In this example, video stream 615 and audio stream 616 were captured by a first device, and video stream 620 and audio stream 621 were captured by a second device. Unlike in FIG. 5A, however, the system of FIG. 5B allows the editor to decouple the video stream from the audio stream so that the editor can choose the video captured by one device and the audio captured by a different device. That is, if the editor chooses a segment from video stream 615, he or she can pick the corresponding segment in audio stream 616 or instead can pick the corresponding segment in audio stream 621 or another audio stream. The user can roll vertically through the available video and audio segments and make selections within each time slot of Y duration in the same manner described for FIG. 5B.

In one embodiment, all video uploaded to server 30 is tagged and marked for future organization on the Review/Edit Platform 500 or 600. CROWDFLIK app 10 and/or server 30 can restrict access to any uploaded video or part thereof based on location and time coding. For example if a performer decides to not allow his or her performance on the CROWDFLIK platform then all video from his or her performance can be blocked by server 30 from future use. Also, content that is inappropriate for certain audiences can be blocked from those users by server 30. For example, video with foul language can be restricted to users who are above age 13, etc.

Figure 2:
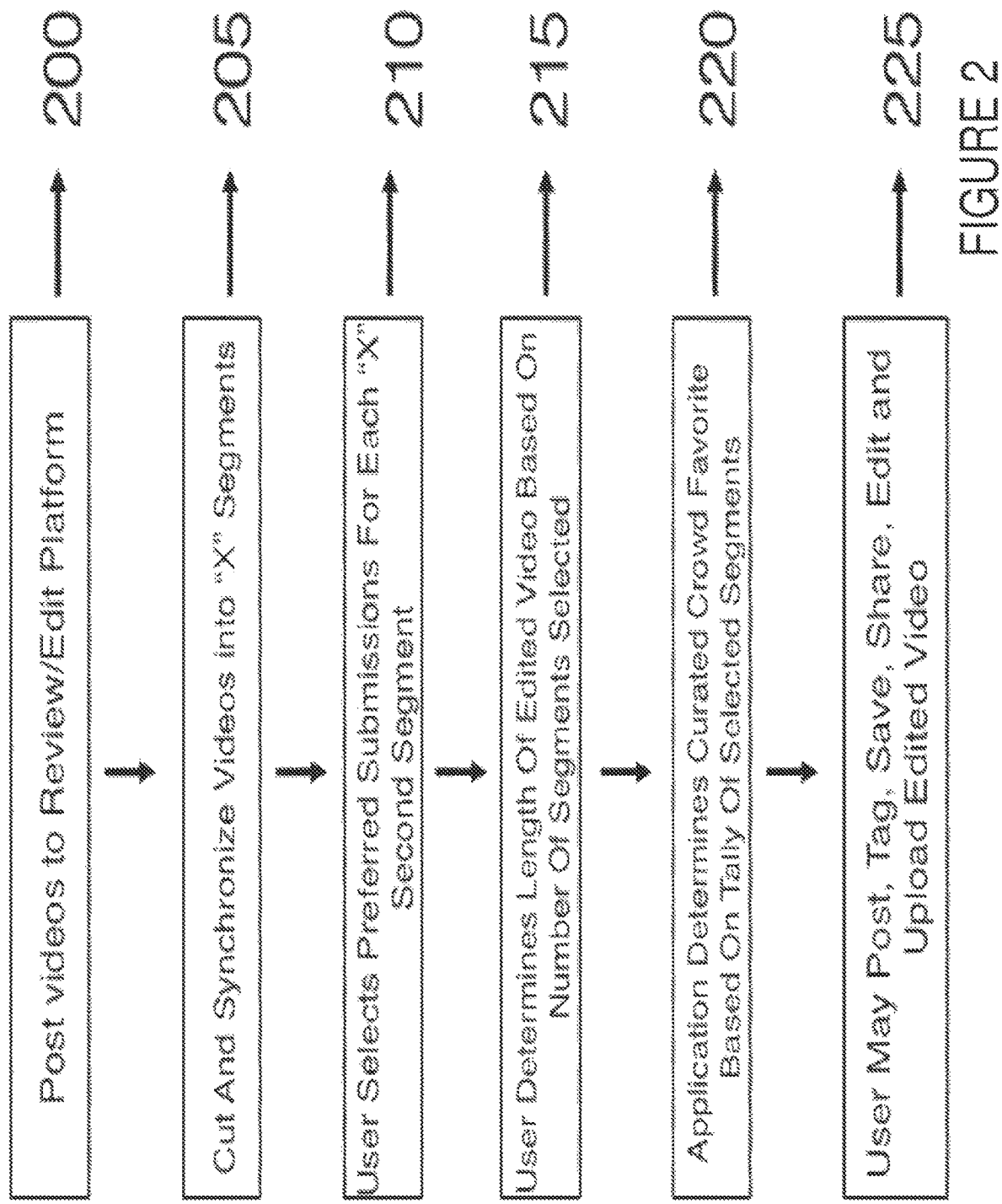
FIG. 2 is a block/flow diagram illustrating an exemplary video capture and submission process of the present system and methods, including the location/date/time tagging and video capture/tag/submission process.

FIG. 2 is a block/flow diagram illustrating an exemplary video capture and submission process of the present system and methods, including the location/date/time tagging and video capture/tag/submission process. The CROWDFLIK Review/Edit platform provides a unique way to edit a video of any event where video has been submitted via the CROWDFLIK app. After a user has captured a video, the captured video can be posted to a review/edit platform at step 200. The submitted videos can be cut, and presented in a time-synchronized manner to allow a user to view all submitted segments for each Y second(s) time period at step 205. A user may select to play the continuous segments from a single submitter, or the user may choose any one of the submitted segments for each Y second(s) time period. Since these Y second(s) pieces were each "cut" or tagged according to the same master clock within the CROWDFLIK app 10, the synchronized reassembly of one submission per time segment creates a unique edit, and plays as a professionally cut and edited video to be viewed, saved, shared, commented on, liked, and rated, as well as reviewed on other popular social media sites.

FIG. 4 is an exemplary screen shot of a Review/Edit Platform similar to that shown in FIG. 5A. The screen shot shows a screen of the present systems, methods, and computer accessible mediums with annotations. In the edit mode, the user can spin clips (e.g., like a slot machine) to select a particular clip. A user can pick a particular clip by setting the clip as the center clip 405. An indication that the clip has been selected may be provided. For example, this clip can be given a "thumbs up" indicia, and it can be tallied as a selected clip. The number of selection tallies may be used to rate and identify popular clips. The user can swipe or scroll to the right to select a particular clip for additional segments, and the user can scroll to the left to reselect a particular clip for a particular segment.

The CROWDFLIK app 10 can be set to allow Y second(s) to be a constant interval throughout a particular captured and edited event or can be set to alternate synchronized values. For example for a wedding event, that is captured and edited via CROWDFLIK, the Y value may be 10 seconds. In this wedding example, each segment is cut into 10 seconds based on the app's master clock. Alternatively, for a sporting event, the Y may be a repeating pattern of 10 seconds/5 seconds/10 seconds/5 seconds. In either or any case, the length of each segment (Y) is applied across all captured video presented on Review/Edit platform 500 for each and all of the multiple sources at that location/time event.

The CROWDFLIK app "cuts" all video captured via the CROWDFLIK app synchronized by the app's master clock to Y second(s) per segment. At step 210 of FIG. 2, a user can select a Y second segment for each position in the video. The user can also select a portion of the entire event video in order to create, save and share shorter videos that are a subset of the overall video of any given location/time event. At step 215, the total length of the video can be determined based on the number of segments that are selected. At step 220, a crowd favorite for each segment can be selected based on the total number of times a segment is selected. The crowd favorite can be dynamically updated as additional segments are selected. The user is given the option to replace their current segment with the crowd favorite if their selection is not the crowd favorite. Once all of the segments have been selected, the edited video can be posted at step 225.

To facilitate the user friendly tap to select or drag and drop editing, the start and end of shorter videos will preferably correspond to a start and end of the Y second(s) segments respectively. An example of this could be selecting a user's edit of a single song from a concert event consisting of many songs or a single series of plays from an entire football game. This mini-edit may also be saved, shared, viewed and re-edited by users who are signed in to their accounts.

The CROWDFLIK app allows for time linear resynchronization or assembly of video segments as well as non-time linear video editing. For example, the user can be permitted to select any submitted video segment and place it anywhere in the video timeline of the user's edit. If a user chooses to drag a video segment into the timeline of his video edit he may do so in any order that he chooses. This allows for video creation and viewing of nonlinear video such as multiple segments from the same Y time slot.

The CROWDFLIK app 10 supports sponsored events via its unique business model whereby the app serves as the connector between fan captured, uploaded, edited, and shared video of an event and the message of the event sponsor venue, act, or other user directed commercial or community based message.

Optionally, the CROWDFLIK app 10's use provides for a unique crowd curated video of each event. As each signed-in user makes, creates and saves a personal edit using one of the systems described previously for FIG. 4, 5A, or 5B (which results in a video clip or "flik"), his or her selection in each time slot across the video timeline and audio timeline (if present) preferably receives a "vote" when the edit is saved by the registered (e.g., signed in) user. The aggregate of these votes for each segment can result in a most voted for, or most selected, submission in each of the Y second(s) time slots. Thus, the aggregate votes allow other users to easily determine which video or audio segments are most popular among the registered users. Each registered user is permitted to create, save and share multiple edits of an event. Each selection of the user can receive one (1) vote. Multiple edits from a registered user may result in multiple submissions in any given time segments receiving votes. A single submission can be limited to no more than one (1) vote per registered user regardless of the number of times that segment appears in the user's various edits. This crowd curated best-of video consists of these submissions, and is the result of a unique process where each user identifies his selection resulting in the best-of listing.

This aspect of the embodiments is shown in FIG. 14. FIG. 14 depicts a method 800 for generating a crowd curated video and audio clip. A plurality of users each create a video and audio clip using Review/Edit Platform 500 or 600 (step 805). Each video and audio segment selected by a user receives a "vote," and a running tally is stored for each segment (step 810). The server 30 indicates to a user which video segment and audio segment for each time segment of Y duration in an event received the most votes (step 815). The server 30 automatically generates a crowd curated video and audio clip containing the video and audio segments that received the most votes for each time segment of Y duration in an event (step 820). A user can then view and listen to the crowd curated video and audio clip (step 825).

In one embodiment, a user may review and edit video on the CROWDFLIK Review/Edit platform as a guest who has not signed in under an account USER ID. In order to encourage user registration, if a user views and edits as a guest (e.g., not signed in or registered), that user may be provided with limited functionality. For example, the user may be precluded from saving edits for future viewing or the edit selections may be ignored in the overall curation tally for best edit or crowd choice.

In one embodiment, the CROWDFLIK app can allow for the automated insertion of sponsor messages at a pre-determined time slot in between certain Y second(s) segments along the time-line of the edited versions of videos as well as the insertion of pre-roll advertising video or other message from a sponsor, advertiser, or other source.

When a user selects CROWDFLIK through which to capture video, the user is prompted to accept/confirm location and time/date. This is to assure that when the CROWDFLIK app submits the user's captured video, it is correctly submitted based on its time/location (e.g., event) characteristics. However, the entry of the time/location information can be performed either prior to, during, or after, video capture. For example, the CROWDFLIK app allows for registered users to capture video prior to confirming location or joining an event, and will prompt the user to select event/location after the capture of video via the CROWDFLIK app.

In one embodiment, the CROWDFLIK app includes algorithms to assess location and time sameness among various submissions. The CROWDFLIK app can also determine if other users are in the vicinity of a signed in user. In a further embodiment, the CROWDFLIK app can notify a user upon location confirmation of nearby friends and/or other CROWDFLIK users.

When the user captures and submits video via CROWDFLIK app 10, the video is also saved on the smart phone camera roll of device 20 just as it would be if it were not captured through CROWDFLIK app 10. The saved video is not cut or altered by CROWDFLIK app 10. CROWDFLIK app 10 allows a user to review each captured video segment and decide or confirm to upload to server 30.

Preferably, the CROWDFLIK app uploads a thumbnail of each video segment as well as the user id of the capturer for easier user identification and review. In one embodiment, the CROWDFLIK app uses the Refactor Video Upload service, or another upload service or protocol, to ensure that the user Id and event Id provided by a user represent real data, and limits the creation of a video record to only occur after a video file and thumbnail was uploaded.

Figure 8:
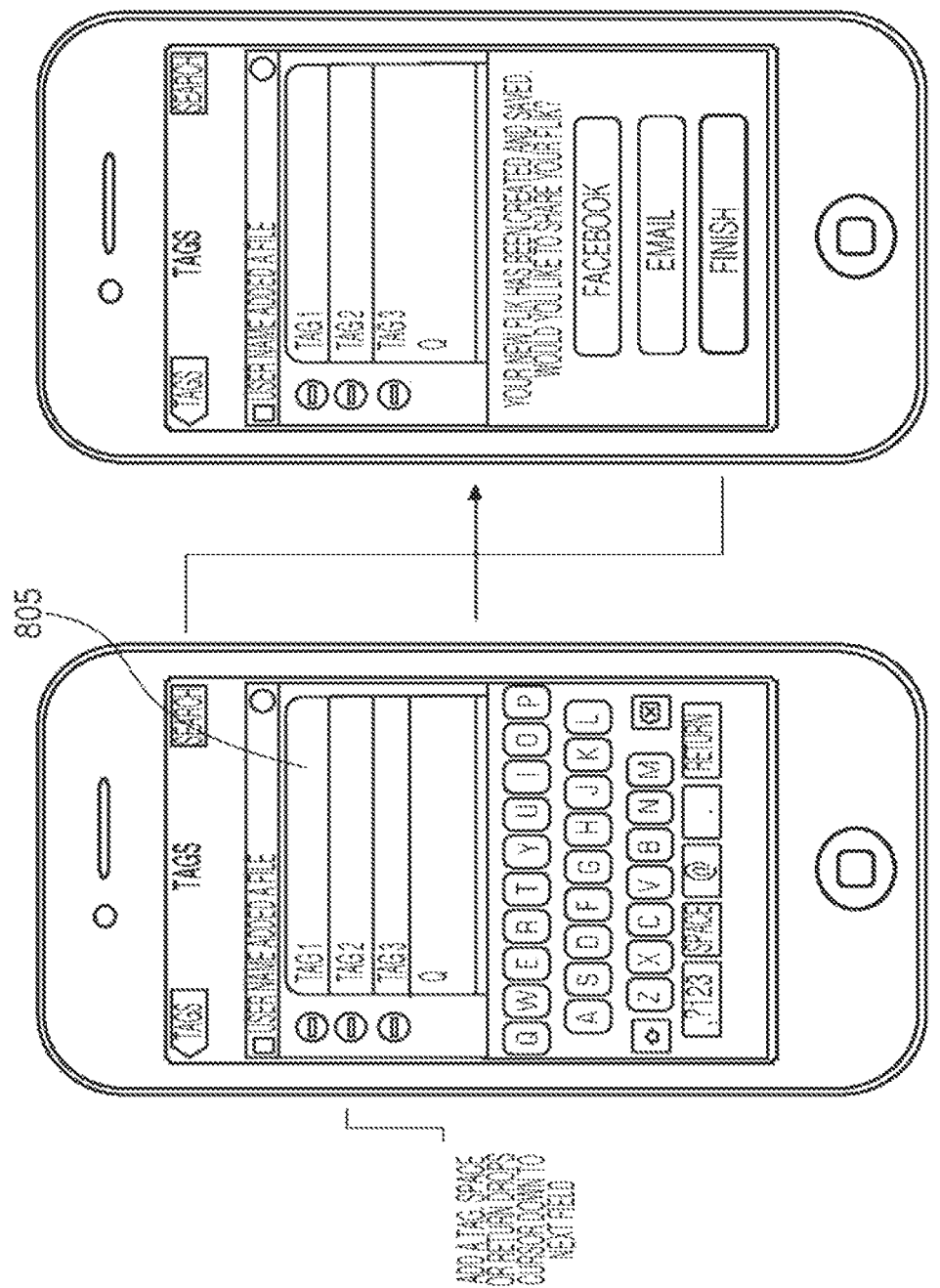
FIG. 8 illustrates the screen flow where users are able to tag and share edits.

When a user creates an edit in the Review/Edit function, the user is able to attach tags 809 to further define the edit or content for later search purposes, as shown in FIG. 8. As illustrated in FIG. 8, the user can also share the edit with others using social media, such as Facebook, or by distributing to one or more individuals by email or text transmission (e.g., short messages service).

CROWDFLIK is a unique video capture and edit mobile and Internet platform that allows multiple users to submit video, and to create unique edits from the aggregate of multiple submitted videos; the CROWDFLIK app achieves this via synchronized tagging with location/time/event stamp at the time of capture, which assures that all video posted to the CROWDFLIK Review/Edit platform for subsequent review and edit is video from matched events based on location, and is synchronized for edit based on the CROWDFLIK app master clock; the synchronized video is searchable based on the time/location tag. In one embodiment, users can select multiple events to be presented on the review/edit platform in order to create a collage-type video. This also allows users to combine multiple CROWDFLIK events of the same real-life event in order to have access to all video captured at that real-life event. If there are multiple CROWDFLIK events of the same real-life event, each of the event creators may agree via the CROWDFLIK app 10 to combine their events to reduce confusion. This might happen, for example, at an event that physically exceeds the established geofence. For example, the presidential inauguration often spans over a mile in physical distance. If the geofence is set for 100 yards, the server may allow the creation of multiple events corresponding to the single real-life event (the presidential inauguration).

The CROWDFLIK app 10 uses a variety of inputs and methods to determine the optimal length for segments of captured video to be cut into for synchronized review and edit at the CROWDFLIK Review/edit platform. This length "Y" synchronized review/edit. The value Y may be in repeating patterns of unequal time segments—such as 10-5-10-5-10-5 seconds, etc. or in single segment length throughout the capture—such as 15-15-15-15 seconds, etc. The CROWDFLIK method of cutting submitted video into Y second(s) pieces allows for a simple and powerful process to create, view, save and share multiple edits based on the selection of a preferred submission for each of the Y second(s) time slots which then seamlessly re-synchronize back together to create a professional quality video consisting of multiple sequential clips of video pieces of lengths of Y second(s).

The CROWDFLIK app 10 tallies the aggregate of the multiple users' selections of segments to create their own edit, which results in a top ranked submission for each Y second(s) time slot. The aggregate of the most selected segments determines the best-of edit as curated by the crowd. To prevent and/or limit gaming, the CROWDFLIK app 10 applies certain methods and analysis to the curation process to determine the best-of edit. The vote tally may change as additional users create edits which will result in the best-of edit to change over time.

The CROWDFLIK app allows for unique sharing and posting of unique edits of videos created from submissions from multiple users and edited by a single user or multiple users.

Figure 6:
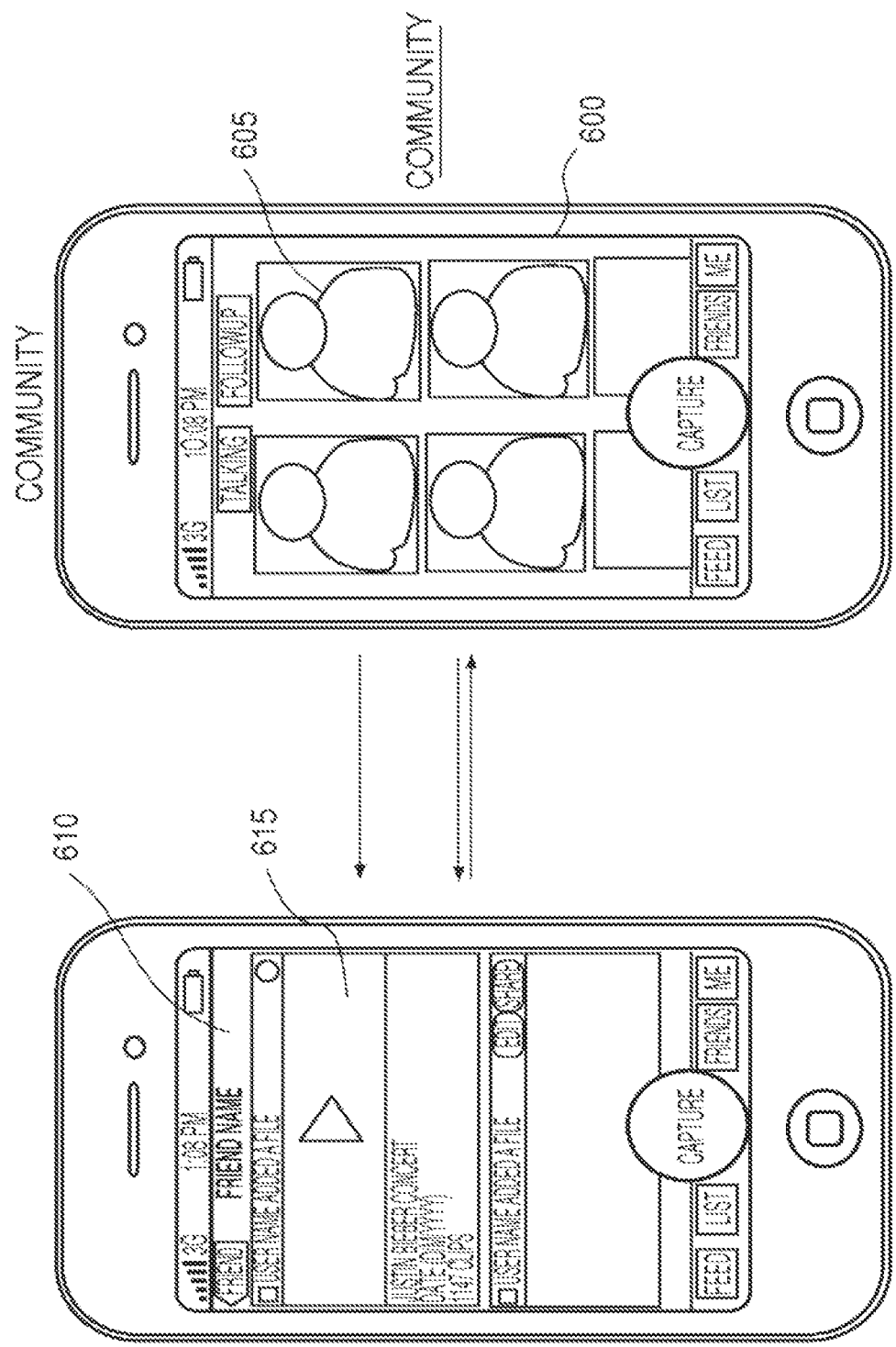
FIG. 6 represents a screen flow enabling a user to follow other CROWDFLIK users and their edits, to perform event check-ins, and to engage in other shared activity.

FIG. 6 represents screen flow enabling a user to follow other CROWDFLIK users and their edits. Once a user logs in to the CROWDFLIK app 10, the user can select a particular friend 600 from a community 605. The user is then taken to the friend's page 610, to see all of the friend's videos 615. The user can subscribe to their friend's page, and can receive automatic updates if their friend posts a new video.

Figure 15:
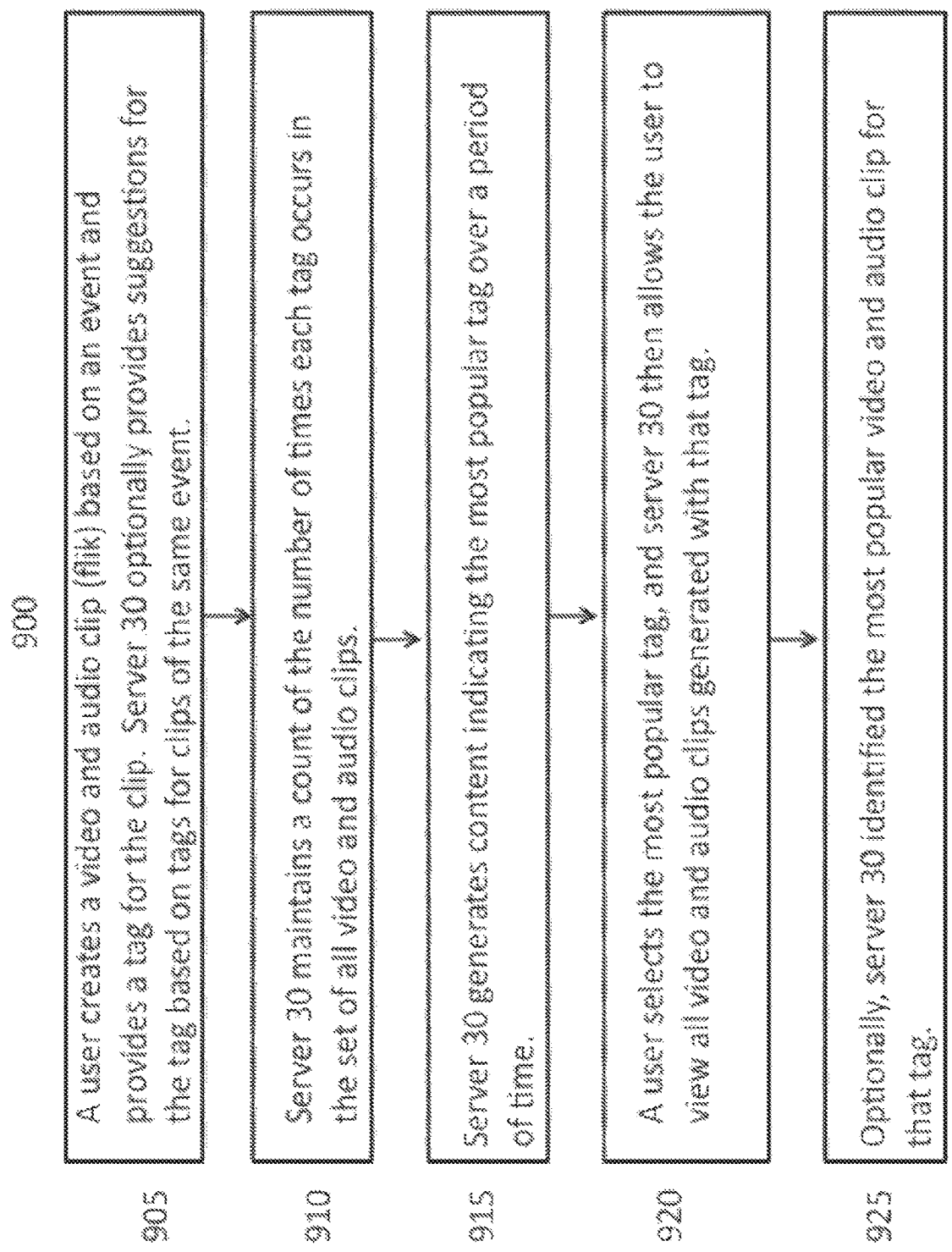
FIG. 15 depicts an embodiment of a trending method.

Another aspect of the embodiments described herein is shown in FIG. 15, which depicts a method 800 for displaying trending data for video and audio clips (fliks) created using the embodiments described herein. A plurality of users each create a video and audio clip using Review/Edit Platform 500 or 600 (step 805). Each video and audio segment selected by a user receives a "vote," and a running tally is stored for each segment (step 810). The server 30 indicates to a user which video segment and audio segment for each time segment of Y duration in an event received the most votes (step 815). The server 30 automatically generates a crowd curated video and audio clip containing the video and audio segments that received the most votes for each time segment of Y duration in an event (step 820). A user can then view and listen to the crowd curated video and audio clip (step 825).

Notably, a user of the systems of FIGS. 4, 5A, and 5B need not have been the creator of any video or audio streams to use the system. That is, a user can access the Review/Edit Platform 500 or 600 from server 30, optionally by searching for a specific topic or event using tags or other metadata. All non-private events will be accessible from server 30 and an unlimited number of video and audio clips (fliks) can be generated for non-private events.

FIG. 16 depicts a data structure 1000 that optionally can be generated by server 30 for each segment of each video or audio stream. Data structure 1000 optionally can include fields for one or more of the following: a unique identifier for the segment (Segment ID), Event Name, Time, Location (Latitude/Longitude), Tags, Name of Creator, Number of times selected, Number of times viewed, and any other metadata associated with the segment.

Figure 17:
FIG. 17 depicts an exemplary data structure for a video or audio clip.

FIG. 17 depicts a data structure 1100 that optionally can be generated by server 30 for each video or audio clip. Data structure 1100 optionally is a playlist or other structure that can include the following: a unique ID for the clip (a Video/Audio Clip ID), the Segment ID for the Segment 1 (the first segment in the clip), the Segment ID for Segment 2, and a Segment ID for all other segments in the clip, ending with the Segment ID for Segment N, where N is the number of segments in the clip.

Figure 18:
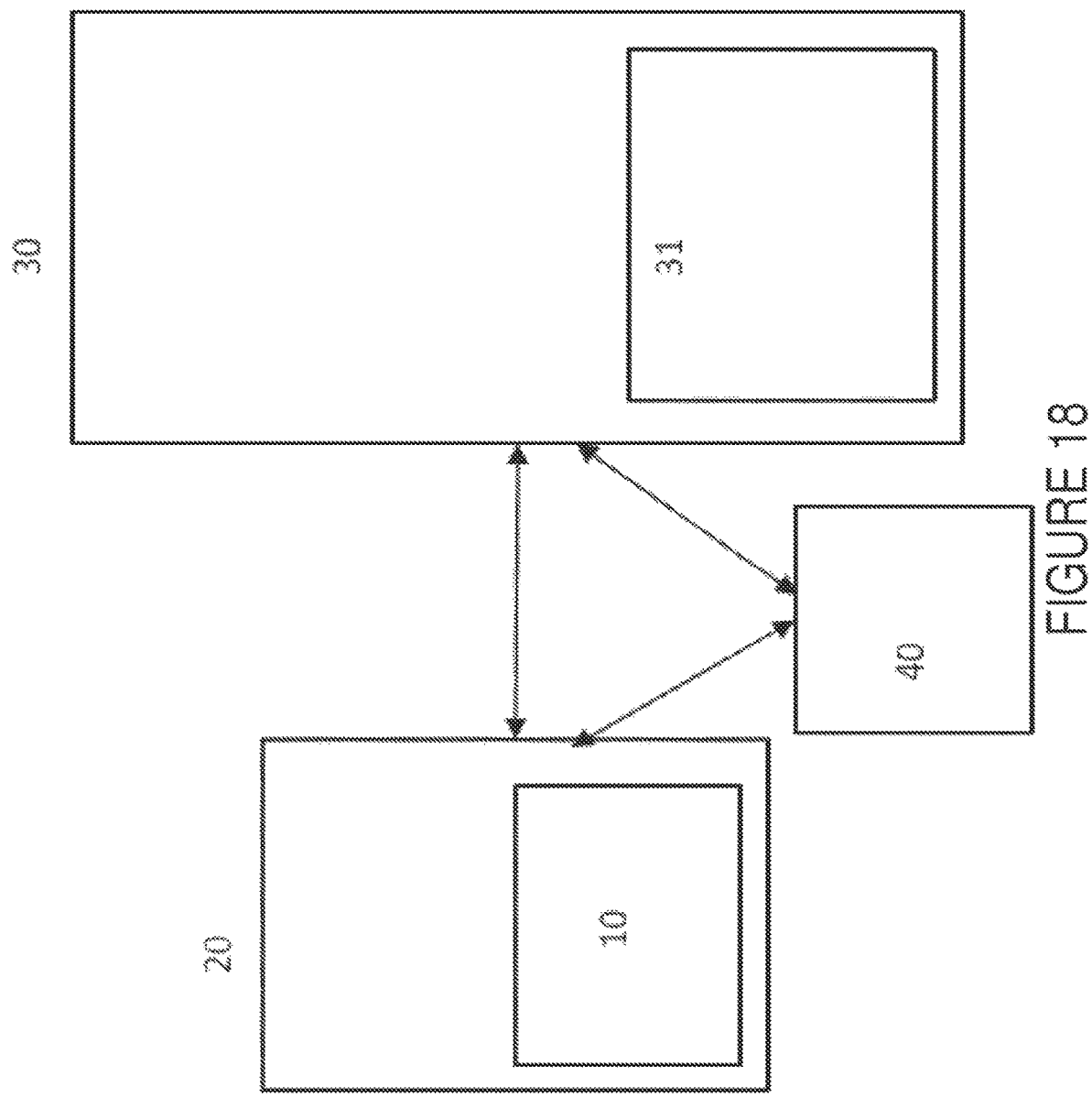
FIG. 18 depicts various hardware and software components used in the embodiments.

FIG. 18 depicts device 20 running CROWDFLIK app 10, coupled to server 30 and reliable clock 40 over a network. Server 30 comprises video store 31, which optionally stores all video streams, audio streams, video segments, audio segments, video clips, and audio clips used by the embodiments described herein. Video store 31 optionally comprises database tables that link each video and audio segment to its Segment ID and data structure 1000 and each video and audio clip to its Video/Audio Clip ID and to data structure 1100. Reliable clock 40 can serve as the master clock described previously.

Figure 19:
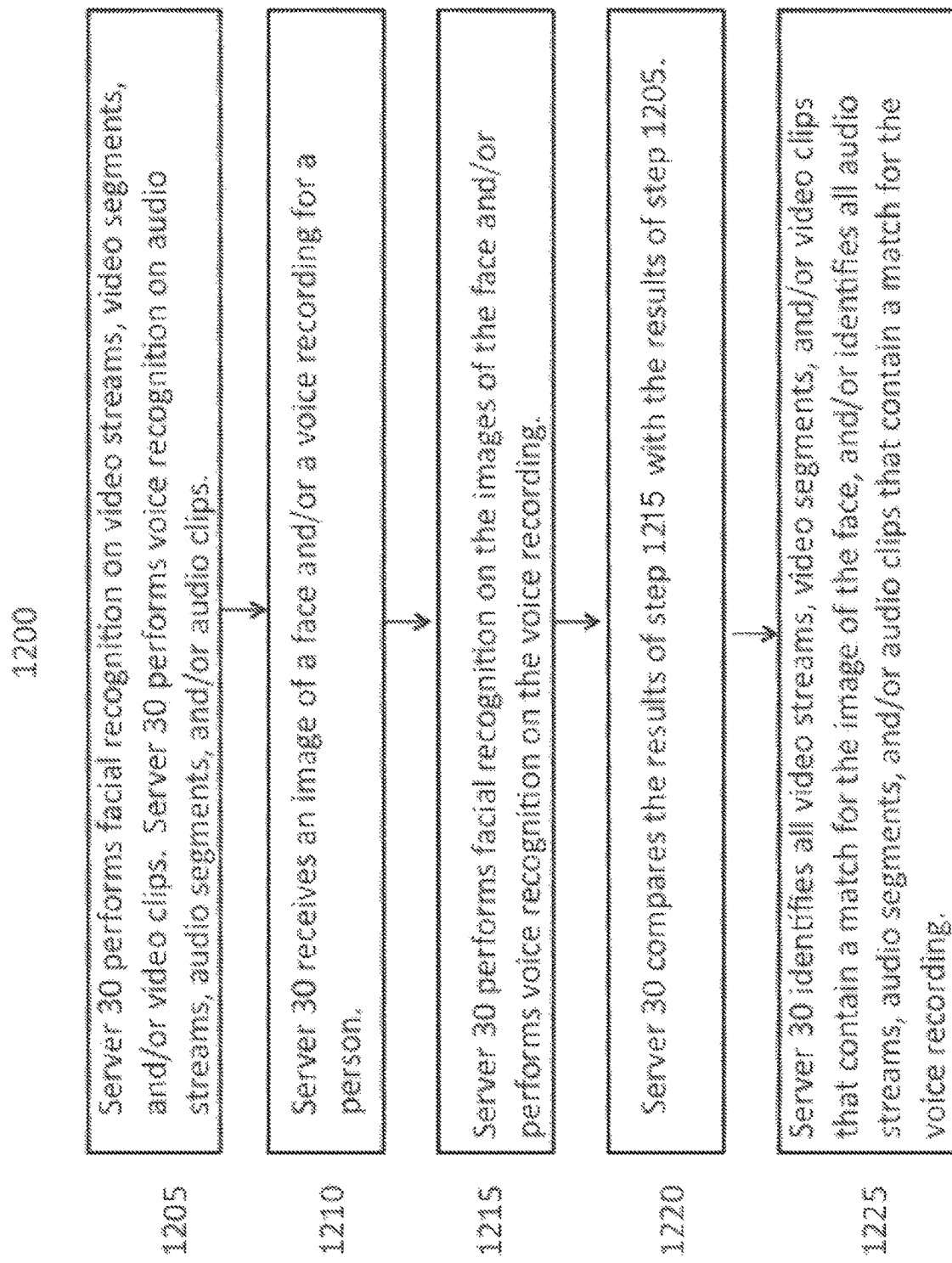
FIG. 19 depicts a method for image recognition and voice recognition.

FIG. 19 depicts an embodiment of facial recognition and voice recognition method 1200. Server 30 performs facial recognition on video streams, video segments, and/or video clips. Server 30 performs voice recognition on audio streams, audio segments, and/or audio clips (step 1205). Server 30 receives an image of a face and/or a voice recording for a person (step 1210). Server 30 performs facial recognition on the images of the face and/or performs voice recognition on the voice recording (step 1215). Server 30 compares the results of step 1251 with the results of step 1205 (step 1220). Server 30 identifies all video streams, video segments, and/or video clips that contain a match for the image of the face, and/or identifies all audio streams, audio segments, and/or audio clips that contain a match for the voice recording (step 1225). This method can be useful, for example, in finding missing persons. A user can upload a photograph of the missing person and then instruct server 30 to perform method 1200. The result of method 1200 potentially is video (correlated with time and location information) containing that person's face, and/or audio (correlated with time and location information) containing that person's voice. This method also can provide search capability more generally and will allow a user to perform non-textual searches within video and audio content using a photograph of a face and/or a voice recording.

Figure 10:
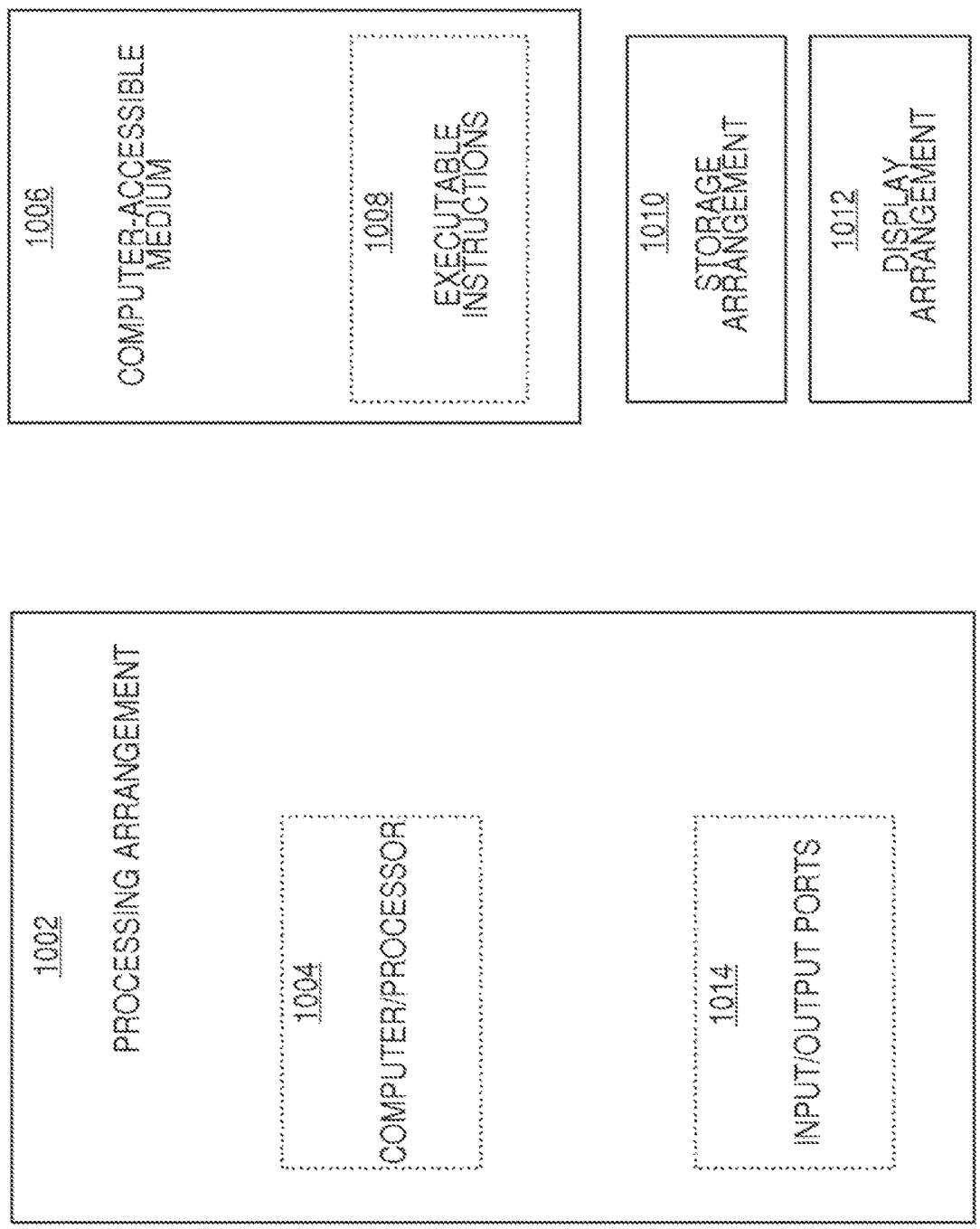
FIG. 10 is an illustration of an exemplary block diagram of an exemplary system in accordance with certain exemplary embodiments of the present disclosure.
Figure 11:
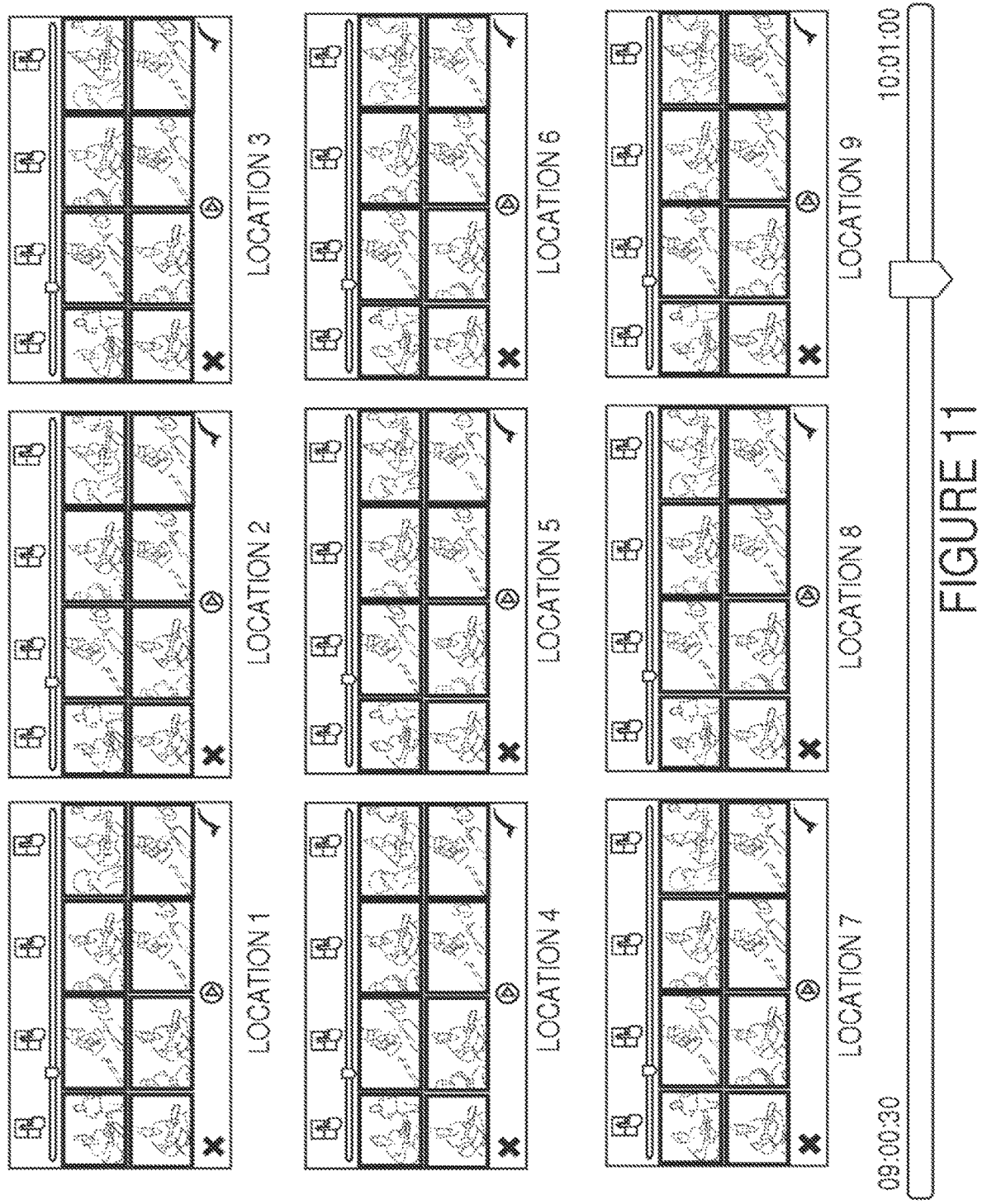
FIG. 11 illustrates video captured of an event from a plurality of devices.
Figure 12:
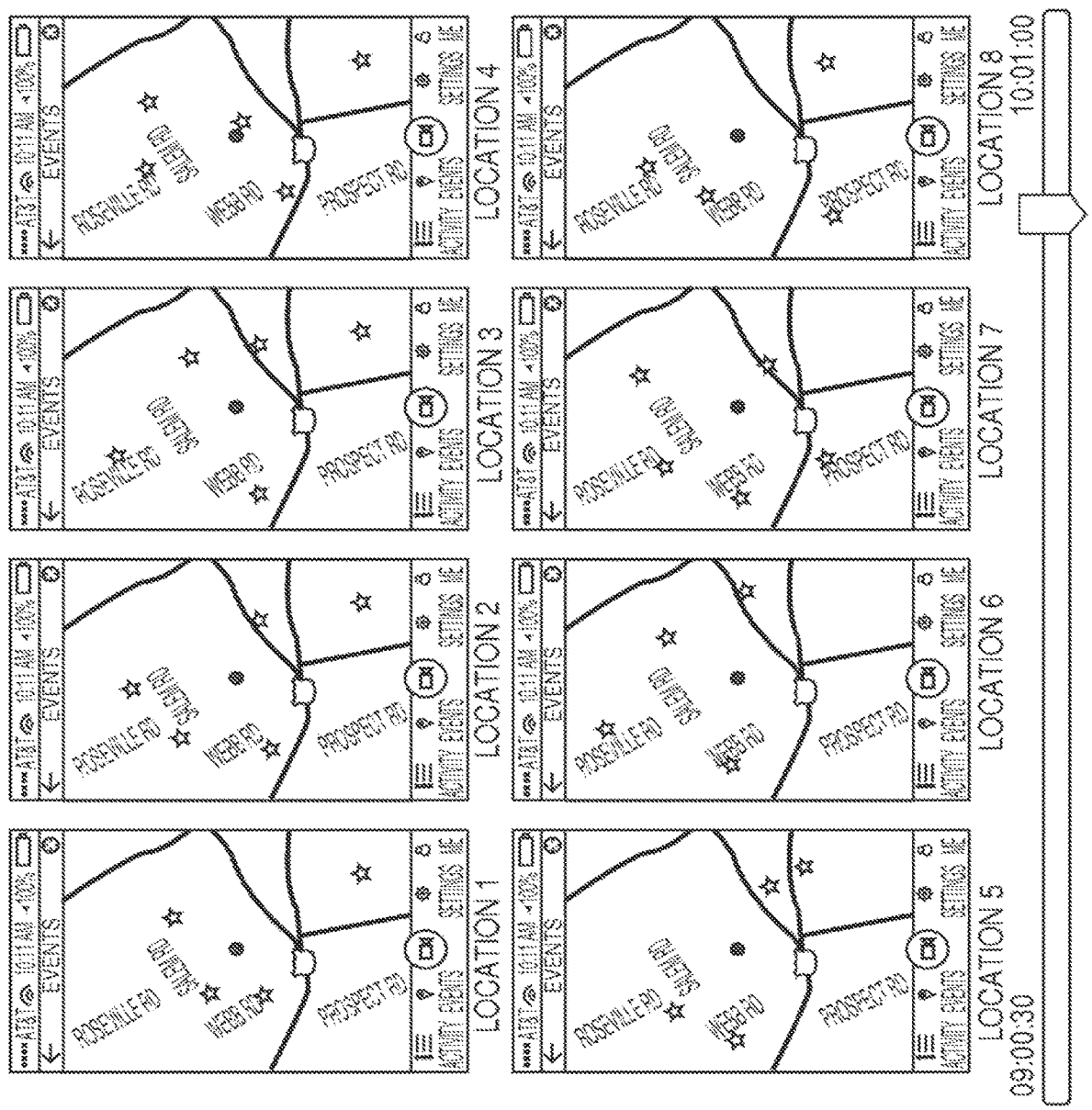
FIG. 12 illustrates an event comprising video captured from devices at different locations.

FIG. 10 shows a block diagram of an exemplary embodiment of a system, typically in the form of mobile telephone, smart phone, tablet, or other processing and communication device, according to the present disclosure. For example, exemplary procedures in accordance with the present disclosure described herein can be performed by a processing arrangement and/or a computing arrangement 1002. Such processing/computing arrangement 1002 can be, for example, entirely or a part of, or include, but not limited to, a computer/processor 1004 that can include, for example, one or more microprocessors, and use instructions stored on a computer-accessible medium (e.g., RAM, ROM, hard drive, or other storage device).

As shown in FIG. 10, for example, a computer-accessible medium 1006 (e.g., as described herein above, a storage device such as a hard disk, floppy disk, memory stick, CD-ROM, RAM, ROM, etc., or a collection thereof) can be provided (e.g., in communication with the processing arrangement 1002). The computer-accessible medium 1006 can contain executable instructions 1008 thereon that implement, inter alia, the CROWDFLIK application software. In addition or alternatively, a storage arrangement 1010 can be provided separately from the computer-accessible medium 1006, which can provide the instructions to the processing arrangement 1002 so as to configure the processing arrangement to execute certain exemplary procedures, processes and methods, as described herein above, for example.

Further, the exemplary processing arrangement 1002 can be provided with or include an input/output arrangement 1014, which can include, for example, a wired network, a wireless network, the internet, an intranet, a data collection probe, a sensor, etc. As shown in FIG. 10, the exemplary processing arrangement 1002 can be in communication with an exemplary display arrangement 1012, which, according to certain exemplary embodiments of the present disclosure, can be a touch-screen configured for inputting information to the processing arrangement in addition to outputting information from the processing arrangement, for example. Further, the exemplary display 1012 and/or a storage arrangement 1010 can be used to display and/or store data in a user-accessible format and/or user-readable format, in a manner well known in the art The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The invention claimed is:

1. A method of automatically generating an audio and video clip comprising a plurality of audio and video segments, comprising:
   receiving a first plurality of audio and video segments each captured by a different device during a first time period in proximity to a first location;
   receiving a second plurality of audio and video segments each captured by a different device during a second time period in proximity to the first location;
   automatically identifying a first audio and video segment with the highest value in a quantitative category of data within the first plurality of audio and video segments;
   automatically identifying a second audio and video segment with the highest value in a quantitative category of data within the second plurality of audio and video segments; and
   generating an audio and video clip comprising the automatically identified first audio and video segment captured during the first time period and the automatically identified second audio and video segment captured during the second time period.

2. The method of claim 1, wherein the quantitative category of data is generated based on user selection of each audio and video segment.

3. The method of claim 1, wherein the quantitative category of data is generated based on ratings received from users.

4. The method of claim 1, wherein the quantitative category of data comprises a running tally of user actions for each of the audio and video segments.

5. A method of automatically generating an audio and video clip comprising a plurality of audio segments and a plurality of video segments, comprising:
   receiving a first plurality of audio segments each captured by a different device during a first time period in proximity to a first location;
   receiving a second plurality of video segments each captured by a different device during the first time period in proximity to the first location;
   receiving a third plurality of audio segments each captured by a different device during a second time period in proximity to the first location;
   receiving a fourth plurality of video segments each captured by a different device during the second time period in proximity to the first location;
   automatically identifying a first audio segment with the highest value in a quantitative category of data within the first plurality of audio segments;
   automatically identifying a first video segment with the highest value in a quantitative category of data within the second plurality of video segments;
   automatically identifying a second audio segment with the highest value in a quantitative category of data within the third plurality of audio segments;
   automatically identifying a second video segment with the highest value in a quantitative category of data within the fourth plurality of video segments; and
   generating an audio and video clip comprising the automatically identified first audio segment captured during the first time period, the automatically identified first video segment captured during the second time period, the automatically identified second audio segment captured during the first time period, the automatically identified second video segment captured during the second time period.

6. The method of claim 5, wherein the quantitative category of data is generated based on user selection of each audio segment.

7. The method of claim 6, wherein the quantitative category of data is generated based on user selection of each video segment.

8. The method of claim 6, wherein the quantitative category of data comprises a running tally of user actions for each segment.

9. The method of claim 5, wherein the quantitative category of data is generated based on ratings received from users.

10. The method of claim 5, wherein the first audio segment, the second audio segment, the first video segment, and the second video segment were captured by different devices.

11. The method of claim 5, further comprising:
    playing the audio and video clip, wherein the first audio segment and the first video segment are played concurrently and then the second video audio segment and the second video segment are played concurrently.

12. The method of claim 11, wherein the step of playing the audio and video clip is performed on a device different than the devices that captured the first audio segment, the second audio segment, the first video segment, and the second video segment.

13. The method of claim 5, further comprising:
    transmitting the audio and video clip from a first device to a second device.

14. A method of automatically generating an audio and video clip comprising a plurality of audio and video segments, comprising:
    receiving a first plurality of audio and video segments each captured by a different device during a first time period in proximity to a first location;
    receiving a second plurality of audio and video segments each captured by a different device during a second time period in proximity to the first location;
    automatically selecting a first audio and video segment from the first plurality of audio and video segments based on image recognition data;
    automatically selecting a second audio and video segment from the second plurality of audio and video segments based on image recognition data; and
    generating an audio and video clip comprising the automatically identified first audio and video segment and the automatically identified second audio and video segment.

15. The method of claim 14, wherein the first audio and video segment and the second audio and video segment were captured by different devices.

16. The method of claim 14, wherein the image recognition data for the step of automatically selecting a first audio and video segment comprises facial recognition data and the image recognition data for the step of automatically selecting a second audio and video segment comprises facial recognition data.

* * * * *